US012759140B2

(12) United States Patent
Jeong et al.

(10) Patent No.: US 12,759,140 B2
(45) Date of Patent: Oct. 13, 2026

(54) RIGIDIZABLE INSERTION TOOL WITH POSITION ADJUSTMENT

(71) Applicants: General Electric Company, Evendale, OH (US); OLIVER CRISPIN ROBOTICS LIMITED, Altrincham (GB)

(72) Inventors: Younkoo Jeong, Clifton Park, NY (US); Zhen Liu, Waterford, NY (US); Hubert Kim, Albany, NY (US); Emilie Renee Baker, Niskayuna, NY (US); Andrew Crispin Graham, Badminton (GB); Peter John Nisbet, Bristol (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 18/989,759

(22) Filed: Dec. 20, 2024

(65) Prior Publication Data

US 2026/0175409 A1 Jun. 25, 2026

(51) Int. Cl.
*B25J 9/10* (2006.01)
*B25J 9/06* (2006.01)
(Continued)

(52) U.S. Cl.
CPC ............ *B25J 9/1045* (2013.01); *B25J 18/06* (2013.01); *B64F 5/60* (2017.01); *B25J 9/065* (2013.01)

(58) Field of Classification Search
CPC . B25J 9/104; B25J 9/1045; B25J 9/065; B25J 15/0233; B25J 18/06; B64F 5/60;
(Continued)

(56) References Cited

U.S. PATENT DOCUMENTS 4,393,728 A 7/1983 Larson
4,751,821 A 6/1988 Birchard
(Continued)

FOREIGN PATENT DOCUMENTS

CN 1533321 9/2004
CN 101237964 8/2008
(Continued)

OTHER PUBLICATIONS

"Tendons Driven Continuum Robots", Continuum Robotics Laboratory-University of Toronto; https://crl.utm.utoronto.ca/_pages/tdcr.html; 2024, 4 pgs.
(Continued)

*Primary Examiner* — Bobby Rushing, Jr.
(74) *Attorney, Agent, or Firm* — Fitch, Even, Tabin & Flannery LLP

(57) ABSTRACT

In some embodiments, apparatuses and methods are provided herein useful to inspect aircraft engine. In some embodiments, a rigidizable insertion tool includes a plurality of links arranged in a sequence. The plurality of links includes at least one deformable link that is structurally deformable. The rigidizable insertion tool may include a tension assembly configured to apply a first tensioning force on the plurality of links to actuate the plurality of links from a relaxed state to a rigidized state having a first shape. The tension assembly may apply a second tensioning force greater than the first tensioning force on the plurality of links while in the rigidized state to cause structural deformation of the at least one deformable link and change a shape of the plurality of links from the first shape. The second tensioning force may change the shape from the first shape to a second shape.

20 Claims, 16 Drawing Sheets

(51) Int. Cl.
*B25J 18/06* (2006.01)
*B64F 5/60* (2017.01)

(58) Field of Classification Search
CPC .............. A61B 34/71; A61B 2034/715; A61B 2017/00323; A61B 1/0057
See application file for complete search history.

(56) References Cited

U.S. PATENT DOCUMENTS

| | | | | |
|---|---|---|---|---|
| 4,848,179 | A | 7/1989 | Ubhayakar | |
| 6,408,224 | B1 | 6/2002 | Okamoto | |
| 7,033,979 | B2 | 4/2006 | Herwig | |
| 7,171,279 | B2 | 1/2007 | Buckingham | |
| 7,543,518 | B2 | 6/2009 | Buckingham | |
| 7,828,808 | B2 | 11/2010 | Hinman | |
| 8,028,936 | B2 | 10/2011 | Mcdermott | |
| 8,214,083 | B2 | 7/2012 | Kawai | |
| 8,277,647 | B2 | 10/2012 | Rice | |
| 8,635,928 | B2 * | 1/2014 | Graham | B25J 18/06 901/21 |
| 8,721,530 | B2 | 5/2014 | Ohline | |
| 8,768,509 | B2 | 7/2014 | Unsworth | |
| 8,826,766 | B2 | 9/2014 | Yasuda | |
| 8,827,948 | B2 | 9/2014 | Romo | |
| 8,951,303 | B2 | 2/2015 | Dehoff | |
| 8,992,421 | B2 | 3/2015 | Stand | |
| 9,138,782 | B2 | 9/2015 | Dorshimer | |
| 9,149,929 | B2 | 10/2015 | Motzer | |
| 9,220,398 | B2 | 12/2015 | Woodley | |
| 9,282,993 | B1 | 3/2016 | Cohen | |
| 9,393,000 | B2 | 7/2016 | Donhowe | |
| 9,604,370 | B2 | 3/2017 | Park | |
| 9,718,187 | B2 | 8/2017 | Ishikawa | |
| 9,739,168 | B2 | 8/2017 | Ekanayake | |
| 9,757,856 | B2 | 9/2017 | Oyola | |
| 9,926,517 | B2 | 3/2018 | Tibbetts | |
| 9,932,854 | B1 | 4/2018 | Tibbetts | |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,046,461 | B2 | 8/2018 | Ekas | |
| 10,052,761 | B2 | 8/2018 | Langenfeld | |
| 10,227,891 | B2 | 3/2019 | Eriksen | |
| 10,323,539 | B2 | 6/2019 | Bewlay | |
| 10,377,968 | B2 | 8/2019 | Brooks | |
| 10,385,723 | B2 | 8/2019 | Flynn | |
| 10,571,642 | B1 | 2/2020 | Cohen | |
| 10,618,162 | B2 | 4/2020 | Norton | |
| 10,634,004 | B2 | 4/2020 | Giljohann | |
| 10,669,885 | B2 | 6/2020 | Pecchiol | |
| 10,737,398 | B2 * | 8/2020 | Remirez | A61B 34/30 |
| 10,920,181 | B2 | 2/2021 | Martin | |
| 10,967,504 | B2 | 4/2021 | Simaan | |
| 11,027,317 | B2 | 6/2021 | Tibbetts | |
| 11,103,992 | B2 | 8/2021 | Tanaka | |
| 11,371,437 | B2 * | 6/2022 | Hawke | F01D 21/003 |
| 11,441,446 | B2 | 9/2022 | Rawson | |
| 11,458,641 | B2 | 10/2022 | Graham | |
| 11,613,003 | B2 | 3/2023 | Graham | |
| 11,679,898 | B2 | 6/2023 | Danko | |
| 11,692,650 | B2 | 7/2023 | Graham | |
| 11,752,622 | B2 | 9/2023 | Graham | |
| 11,787,050 | B1 * | 10/2023 | Kaehler | B25J 11/008 700/253 |
| 11,787,069 | B2 | 10/2023 | Curle | |
| 11,834,990 | B2 | 12/2023 | Hawke | |
| 11,977,217 | B2 | 5/2024 | Graham | |
| 2005/0107667 | A1 | 5/2005 | Danitz | |
| 2011/0313568 | A1 | 12/2011 | Blackwell | |
| 2013/0110289 | A1 | 5/2013 | Cho | |
| 2013/0165754 | A1 | 6/2013 | Frassica | |
| 2013/0165908 | A1 | 6/2013 | Purdy | |
| 2013/0255410 | A1 | 10/2013 | Lee | |
| 2013/0340559 | A1 | 12/2013 | Danitz | |
| 2014/0058364 | A1 | 2/2014 | Donhowe | |
| 2014/0090506 | A1 | 4/2014 | Tobey | |
| 2014/0260755 | A1 | 9/2014 | Dong | |
| 2014/0276956 | A1 | 9/2014 | Crainich | |
| 2015/0122071 | A1 * | 5/2015 | Lee | B25J 18/06 74/490.04 |
| 2015/0159122 | A1 | 6/2015 | Tibbetts | |
| 2015/0265438 | A1 | 9/2015 | Hossainy | |
| 2015/0283699 | A1 | 10/2015 | Morin | |
| 2015/0283710 | A1 | 10/2015 | Schrader | |
| 2015/0313619 | A1 | 11/2015 | Tadano | |
| 2015/0321427 | A1 | 11/2015 | Gunnarsson | |
| 2015/0352584 | A1 | 12/2015 | Franz | |
| 2016/0001444 | A1 | 1/2016 | Kwok | |
| 2016/0008990 | A1 | 1/2016 | Franz | |
| 2016/0016319 | A1 | 1/2016 | Remirez | |
| 2016/0046018 | A1 | 2/2016 | Robertson | |
| 2016/0052129 | A1 | 2/2016 | Ekas | |
| 2016/0052131 | A1 | 2/2016 | Lessing | |
| 2016/0279789 | A1 | 9/2016 | Axinte | |
| 2017/0014998 | A1 | 1/2017 | Langenfeld | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0210015 | A1 | 7/2017 | Jogasaki | |
| 2017/0254217 | A1 | 9/2017 | Eriksen | |
| 2018/0149038 | A1 | 5/2018 | Eriksen | |
| 2018/0155060 | A1 | 6/2018 | Dauenhauer | |
| 2018/0214220 | A1 | 8/2018 | Kan | |
| 2018/0216036 | A1 | 8/2018 | Tibbetts | |
| 2018/0237163 | A1 | 8/2018 | Bewlay | |
| 2018/0242958 | A1 | 8/2018 | Dayton | |
| 2018/0243900 | A1 | 8/2018 | Tanaka | |
| 2018/0245477 | A1 | 8/2018 | Kulkarni | |
| 2018/0258787 | A1 * | 9/2018 | Tibbetts | F01D 25/002 |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0015978 | A1 | 1/2019 | Takagi | |
| 2019/0126497 | A1 | 5/2019 | Onal | |
| 2019/0153890 | A1 | 5/2019 | Eriksen | |
| 2019/0196449 | A1 | 6/2019 | Zhang | |
| 2019/0323378 | A1 | 10/2019 | Tibbetts | |
| 2019/0358833 | A1 | 11/2019 | Graham | |
| 2019/0366536 | A1 | 12/2019 | Graham | |
| 2019/0383158 | A1 | 12/2019 | Diwinsky | |
| 2020/0046209 | A1 | 2/2020 | Fancher | |
| 2020/0114505 | A1 | 4/2020 | Kikuchi | |
| 2020/0114528 | A1 * | 4/2020 | Graham | B25B 33/00 |
| 2020/0189095 | A1 | 6/2020 | Manfredi | |
| 2020/0315424 | A1 | 10/2020 | Graham | |
| 2021/0108537 | A1 | 4/2021 | Rigg | |
| 2021/0317752 | A1 | 10/2021 | Deja | |
| 2021/0388737 | A1 | 12/2021 | Foxall | |
| 2022/0176524 | A1 | 6/2022 | Graham | |
| 2022/0221706 | A1 * | 7/2022 | Trivedi | F01D 5/005 |
| 2022/0410411 | A1 | 12/2022 | Graham | |
| 2023/0194234 | A1 | 6/2023 | Graham | |
| 2024/0148238 | A1 * | 5/2024 | Lim | A61B 1/0011 |

FOREIGN PATENT DOCUMENTS

| | | | |
|---|---|---|---|
| CN | 206840080 | | 1/2018 |
| DE | 102013202616 | A1 | 8/2014 |
| DE | 102015006330 | | 11/2016 |
| WO | 2010040215 | | 4/2010 |
| WO | 2012037598 | | 3/2012 |
| WO | 2013078529 | | 6/2013 |
| WO | 2017193013 | | 11/2017 |
| WO | 2020022474 | A1 | 1/2020 |
| WO | 2020030516 | A1 | 2/2020 |

(56) References Cited

OTHER PUBLICATIONS

Gendreau Dominique et al, "3D-Printing: A promising technology to design three-dimensional microsystems", 2016 International Conference on Manipulation, Automation and Robotics at Small Scales (MARSS), IEEE, (Jul. 18, 2016), doi:10.1109/MARSS.2016.7561724, pp. 1-5, XP032957756.
Krieger Yannick S et al, "Multi-arm snake-like robot", 2017 IEEE International Conference on Robotics and Automation (ICRA), IEEE, (May 29, 2017), doi:10.1109/ICRA.2017.7989290, pp. 2490-2495, XP033127032.
Roppenecker et al, "Multi arm snake-like robot kinematics", 2013 IEEE/RJS International Conference on Intelligent Robots and Systems, IEEE, Nov. 3, 2013, pp. 5040-5045.
Saari et al, "Fiber Encapsulation Additive Manufacturing: An Enabling Technology for 3D Printing of Electromechanical Devices and Robotic Components", 3D Printing and Additive Manufacturing, vol. 2, No. 1, Mar. 2015, pp. 32-39.
USPTO; U.S. Appl. No. 15/986,978; Advisory Action mailed Nov. 19, 2021 (5 pages).
USPTO; U.S. Appl. No. 15/986,978; Notice of Allowance and Fees Due (PTOL-85) mailed Jun. 1, 2022 (12 pages).
USPTO; U.S. Appl. No. 15/986,978; Notice of Allowance and Fees Due (PTOL-85) mailed Jun. 15, 2022 (3 pages).
USPTO; U.S. Appl. No. 15/986,978; Office Action mailed Feb. 3, 2022 (23 pages).
USPTO; U.S. Appl. No. 15/986,978; Office Action mailed May 25, 2021 (20 pages).
USPTO; U.S. Appl. No. 15/986,978; Office Action mailed Aug. 18, 2020 (17 pages).
USPTO; U.S. Appl. No. 15/986,978; Office Action mailed Aug. 30, 2021 (24 pages).
USPTO; U.S. Appl. No. 15/986,978; Office Action mailed Dec. 8, 2020 (24 pages).
USPTO; U.S. Appl. No. 13/155,520; Final Rejection mailed Sep. 12, 2024 (pp. 1-17).
USPTO; U.S. Appl. No. 13/155,520; Final Rejection mailed Sep. 22, 2023 (pp. 1-27).
USPTO; U.S. Appl. No. 13/155,520; Non-Final Rejection mailed Feb. 5, 2024 (pp. 1-21).
USPTO; U.S. Appl. No. 13/155,520; Non-Final Rejection mailed May 17, 2024 (pp. 1-16).
USPTO; U.S. Appl. No. 13/155,520; Non-Final Rejection mailed Jun. 16, 2023 (pp. 1-22).

* cited by examiner

Baseline
Max Total Deformation: 0.020991 mm

Load Applied In FEA: 30N

Slot
Max Total Deformation: 0.10651 mm

Load Applied In FEA: 30N

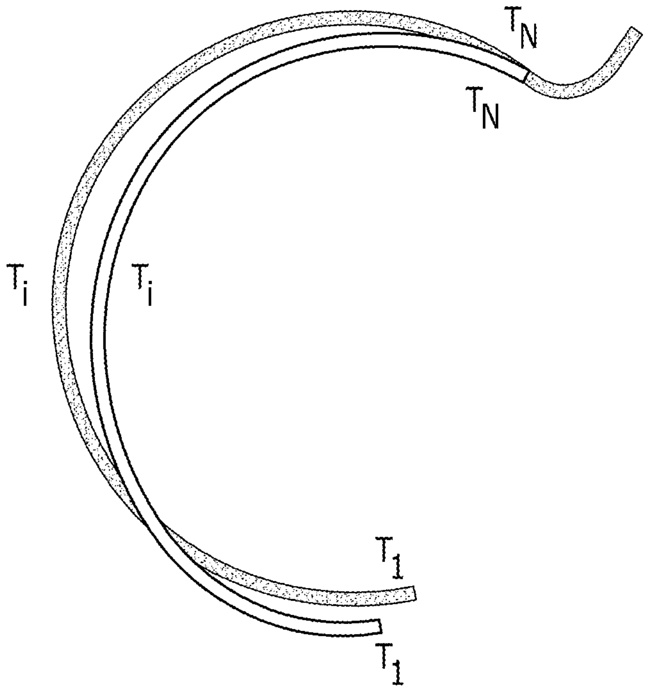

$T_i$, $i \in [1,N]$: Tensioning Force Applied By Tension Assembly When Deploying The $i_{th}$ Link

- Inspection Tool With A Single Tension Applied During Deployment: $T_1 = T_i = T_N$
- Tool Shape Deviates From Ideal Circular Shape Due To Friction And Gravity
- Inspection Tool With Continuous Tension Adjustment During Deployment To Create Tension Gradient Along The Tool: Gradient Change From $T_1 \rightarrow T_i \rightarrow T_N$
- Gradient Tension Is Used To Compensate For The Effect Of Gravity On The Shape Of Inspection Tool Based On The Length And Pose Of The Deployed Portion etc.

FIG. 12

$$T_i - T_{i-1} = T_{i-1}(e^{\mu\theta} - 1)$$

$$L = R\theta$$

$$\Downarrow$$

$$T_i - T_{i-1} = T_{i-1}(e^{\mu L/R} - 1)$$

RIGIDIZABLE INSERTION TOOL WITH POSITION ADJUSTMENT

TECHNICAL FIELD

This disclosure relates generally to a tool for inspecting an environment and/or performing maintenance operations on a component within the environment, such as within an annular space in an aircraft engine.

BACKGROUND

At least certain aircraft engines include, in serial flow arrangement, a compressor section including a low pressure compressor and a high pressure compressor for compressing air flowing through the aircraft engine, a combustor for mixing fuel with the compressed air such that the mixture may be ignited, and a turbine section including a high pressure turbine and a low pressure turbine for providing power to the compressor section.

Within one or more of the sections, at least certain aircraft engines define an annular opening. Certain of these annular openings may vary in size and shape, such that a dedicated, specialized insertion tool must be utilized with each annular opening to extend around and through such annular opening. The aviation service industry continues to demand improvements to insertion tools to increase versatility and reduce the number of individual components required on site during servicing operations.

BRIEF DESCRIPTION OF DRAWINGS

Disclosed herein are embodiments of systems, apparatuses and methods pertaining to insertion tool. This description includes drawings, wherein:

FIG. 12 depicts a rigidizable insertion tool in which the use of a tension gradient is illustrated to compensate for gravity and orientation of the tool in accordance with some embodiments.

Figure 1A:
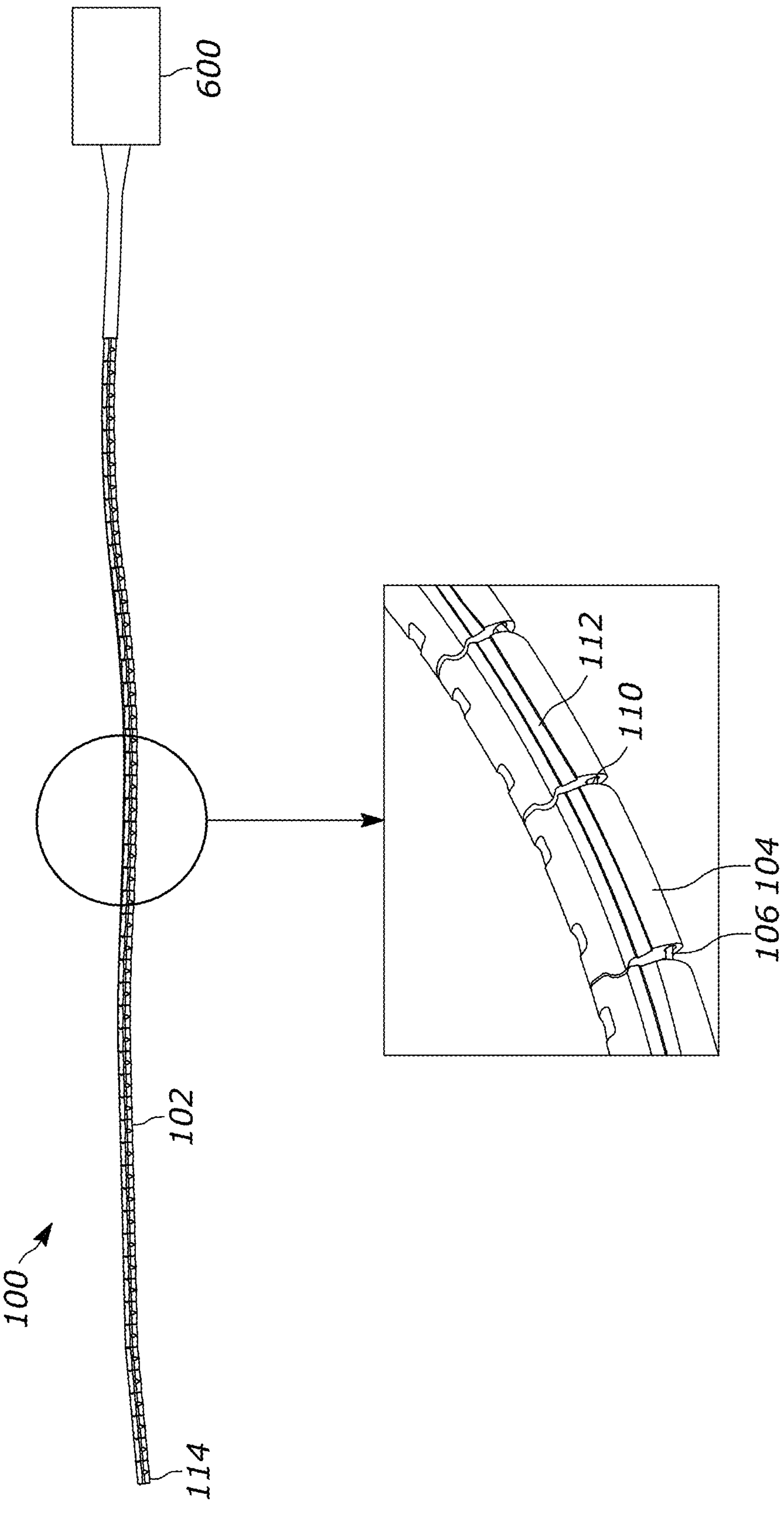
FIG. 1A is a side view and an enlarged side view of a rigidizable insertion tool in a relaxed state in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, the present approaches provide link assemblies (e.g., used in snake arm robots) that include at least one deformable link in the link assembly. The use of the deformable link allows the link assembly to be tensioned into tighter curves thereby allowing the link assembly to be more effective when, for example, inserted into an aircraft engine and used to conduct maintenance operations. For example, the approaches provided herein improve camera positioning accuracy and image quality improvement in the presence of gravitational load and manufacturing tolerance accumulation. As such, the maintenance burdens for engines are reduced. In other advantages, the approaches provided herein provide a simple, low-cost and effective inspection tool position adjustment procedure that compensates position deviation caused by various factors such as structural deflection under gravitational load, accumulation of manufacturing and assembly tolerance, and/or engine mounting variation.

Pursuant to various embodiments, systems, apparatuses and methods are provided herein useful to permit an operator and/or a robotic assembly to inspect a cavity of an engine defining a path. In some embodiments, a rigidizable insertion tool includes a plurality of links arranged in a sequence. The plurality of links can include at least one link that is structurally deformable. The rigidizable insertion tool can include a tension assembly that applies a first tensioning force on the plurality of links to actuate the plurality of links from a relaxed state to a rigidized state having a first shape. In some embodiments, the tension assembly applies a second tensioning force greater than the first tensioning force on the plurality of links while in the rigidized state to cause structural deformation of the at least one link and change a shape of the plurality of links from the first shape. The second tensioning force can change the shape from the first shape to a second shape.

In some embodiments, a method for operating a rigidizable insertion tool within an engine defining a path includes inserting the rigidizable insertion tool at least partially into the path of the engine while a plurality of links of the rigidizable insertion tool are in a relaxed state. The rigidizable insertion tool includes a plurality of links arranged in a sequence and a tension assembly. The plurality of links can include at least one link that is structurally deformable. The method may include applying, by the tension assembly, a first tensioning force on the plurality of links to actuate the plurality of links from the relaxed state to a rigidized state having a first shape. In some embodiments, the method includes applying, by the tension assembly, a second tensioning force greater than the first tensioning force on the plurality of links while in the rigidized state to cause structural deformation of the at least one structurally deformable link and change a shape of the plurality of links from the first shape. The second tensioning force may change the shape from the first shape to a second shape.

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of this disclosure. Thus, appearances of the phrases "in one embodiment," "in an embodiment," "in some embodiments", "in some implementations", and similar language throughout this specification may, but do not necessarily, all refer to the same embodiment.

Figure 1B:
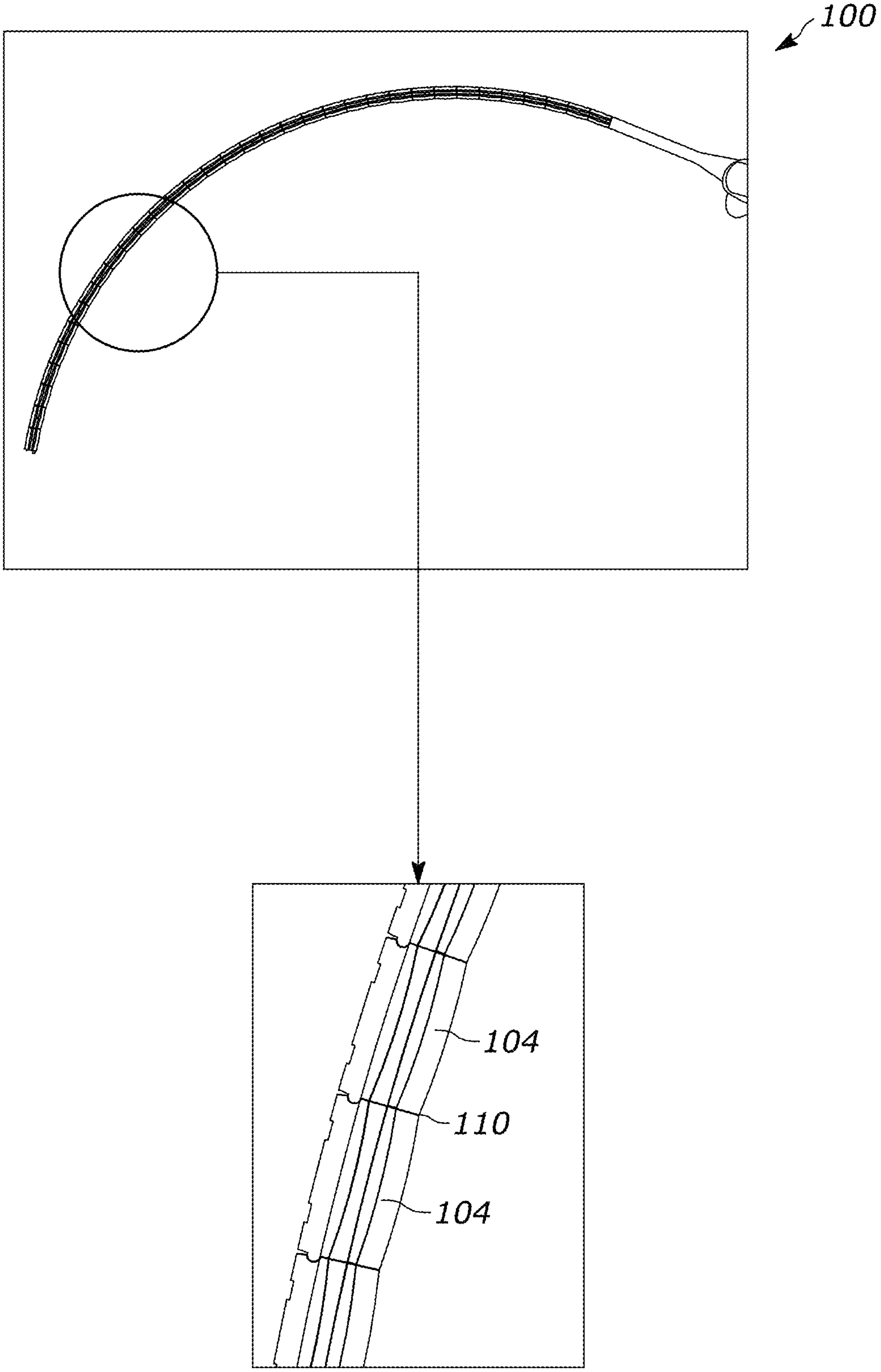
FIG. 1B is a side view and one enlarged side views of the rigidizable insertion tool in FIG. 1A in a rigidized state in accordance with some embodiments.

Referring now to the drawings, FIGS. 1A-1B, and FIGS. 6A-6C are described concurrently. FIG. 1A includes a side view of a rigidizable insertion tool 100 in a relaxed state in accordance with some embodiments. FIG. 1B includes a side view of the rigidizable insertion tool 100 in FIG. 1A in a rigidized state in accordance with some embodiments. In some embodiments, the rigidizable insertion tool 100 (also called rigidized insertion tool) includes a plurality of links 102 arranged in a sequence. In some embodiments, a rigidizable insertion tool 100 may correspond to an insertion tool that is rigidizable from a state in which the tension assembly may apply relatively smaller or little or no force to a state in which the tension assembly may apply a large or larger force to urge the links into a closely coupled position.

Each of the plurality of links 102 is an individual structure and the links are sequentially arranged, end-to-end along a longitudinal axis to form a link assembly (also referred to herein as the plurality of links 102). As described elsewhere herein, movement and shaping of the links is controllable. At the end of the leading link, or along the length of the rigidizable insertion tool 100, various tools can be deployed including cameras, drills, saws, etc. In aspects, the link assembly is deployed within an aircraft engine to perform maintenance operations including inspection and/or repair operations to the internal components of the engine.

The plurality of links 102 can include at least one link 104 (also referred to herein as the "deformable link") that is structurally deformable. In some structures described herein there is a single deformable link 104, while in other structures (e.g., as shown in FIG. 1B) there are multiple deformable links 104. The number and positioning of these deformable links 104 is selected to achieve various shapes of the link assembly. In some embodiments, the link 104 may include compressible or deformable material, such as one or more of Nylon, acrylonitrile butadiene styrene (ABS), Polycarbonate, Polypropylene, high density polyethylene (HDPE), polysulfone (PSU), polybutylene terephthalate (PBT), polyvinyl chloride (PVC), and/or polytetrafluoroethylene (PTFE), to mention a few examples. In some embodiments, one or more or all of the compressible or deformable materials previously discussed may also be compliant and/or elastic materials. In some embodiments, the deformable link 104 may include a compressible structural feature such as a channel cut-out. In some embodiments, the channel cut out allows the deformable link 104 to bend further relative to another link that does not have a channel cut out. For example, having the opening 304 (shown in FIG. 3C) through the deformable portion 204 (shown in FIGS. 2A, 2B, 3A, and 3B) allows the deformable link 104 to bend more since the gap created by the opening 304 allows the portion of the deformable link 104 under tension to be axially displaced further until the gap narrows and the portion under tension contacts the other portion of the deformable link 104.

By deformable or compressible, it will be appreciated that the deformable link 104 can be stretched and/or compressed in any direction including longitudinally (along a longitudinal axis extending through the series of links), radially (outward from the longitudinal axis), or a combination of these directions. In doing so, the original shape and/or dimensions of the deformable link 104 are altered. In some aspects, once the deformable link 104 is stretched and whatever force or actuation is causing the stretching is removed, the deformable link 104 returns to its original shape and/or dimensions.

In some aspects, the deformable link 104 is deformable or compressible because it is constructed of a material that allows deformation or compression to occur. Alternatively or in addition, physical features (e.g., channels, holes, openings, shaping of the link) may be used to facilitate or allow deformation or compression to occur. The links may deform or compress differently in different areas of the link depending upon the materials and/or features used. This may be achieved by using different materials, different concentrations of materials, and/or different physical features in different parts of the deformable link 104. For example, a distal end of the deformable link 104 may be formed of one material and a proximal end formed of a different material. In other examples, the deformable link 104 is formed of a single material and the link deforms or compresses more closely to an area of the link where a force is applied.

In some aspects, one link in the link assembly is deformable. In other aspects, all links in the link assembly is deformable. In other examples, multiple links are deformable, such that the link assembly is made of both deformable links and non-deformable links. The positioning or location of the deformable link (or links) within the link assembly may be selected according to a variety of factors such as a radius of curvature desired when the link assembly is actuated and/or the final desired shape of the link assembly. For example, positioning the deformable link 104 towards the front of the link assembly may allow the link assembly to curve or be bent near the front of the link assembly. In some embodiments, a non-deformable link may be a link made of one or more materials that are high-stiffness materials relative to the deformable link rendering the link much less compressible when tension is applied to the link assembly. The deformable link when the same tension is applied to the link assembly may be compressed or compliant as exemplified in FIGS. 11A and 11B.

Advantageously, the use of deformable links allows the link assembly to be bent into smaller, tight, or combined spaces or components. The link assembly may be bent into a curve with a certain radius, with the center of the radius being located at some point located outside the link assembly. The shorter the radius, the tighter the curve of the link assembly. The longer the radius, the less able the link assembly is to fit into tight spaces. Using a deformable link (or links) allows a tighter curve and this, in turn, lets the link assembly be placed into tighter spaces and positioned precisely within these spaces.

Figure 11A:
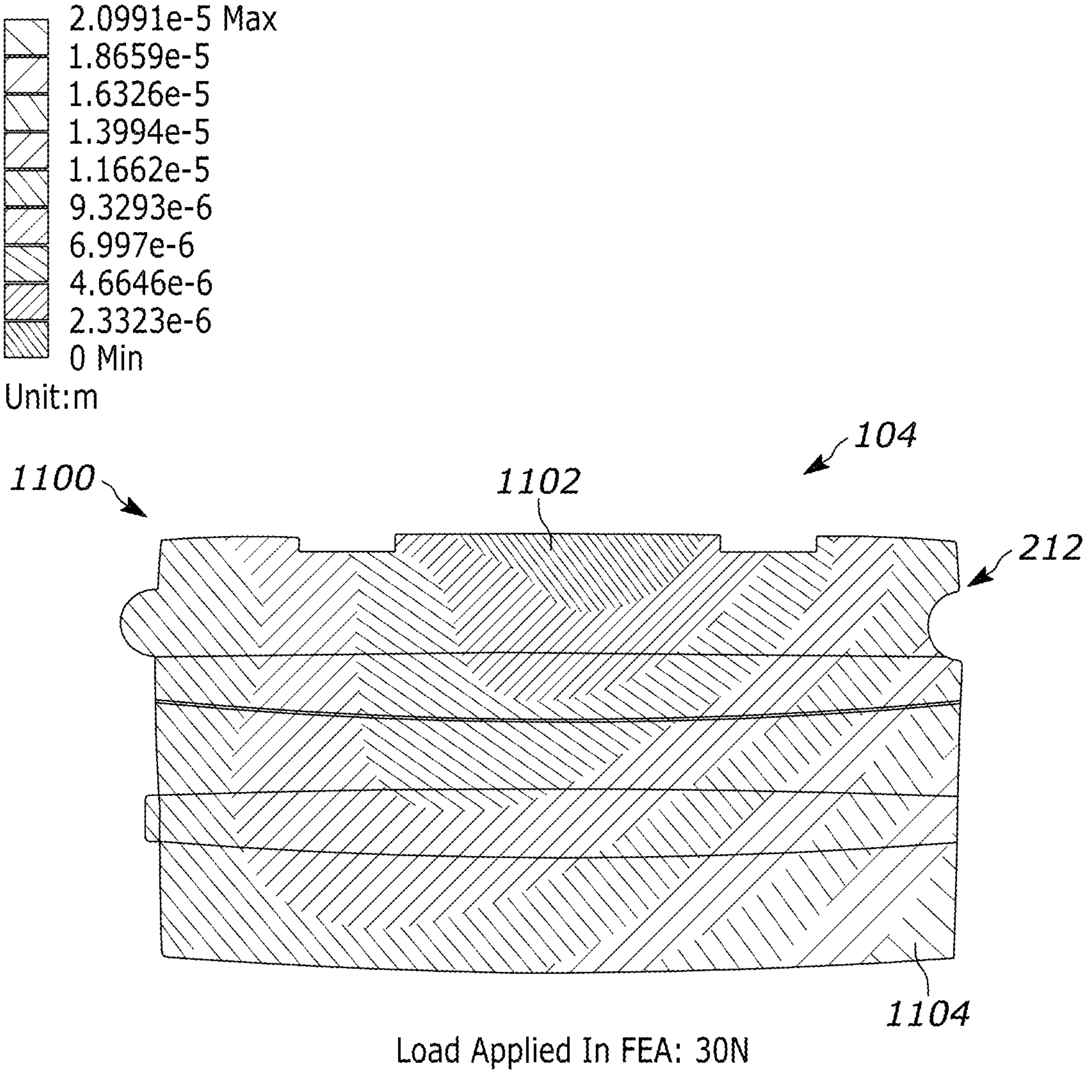
FIG. 11A depicts an exemplary deformation compliance of a link having a link geometry shown in FIG. 2 in accordance with some embodiments.
Figure 11B:
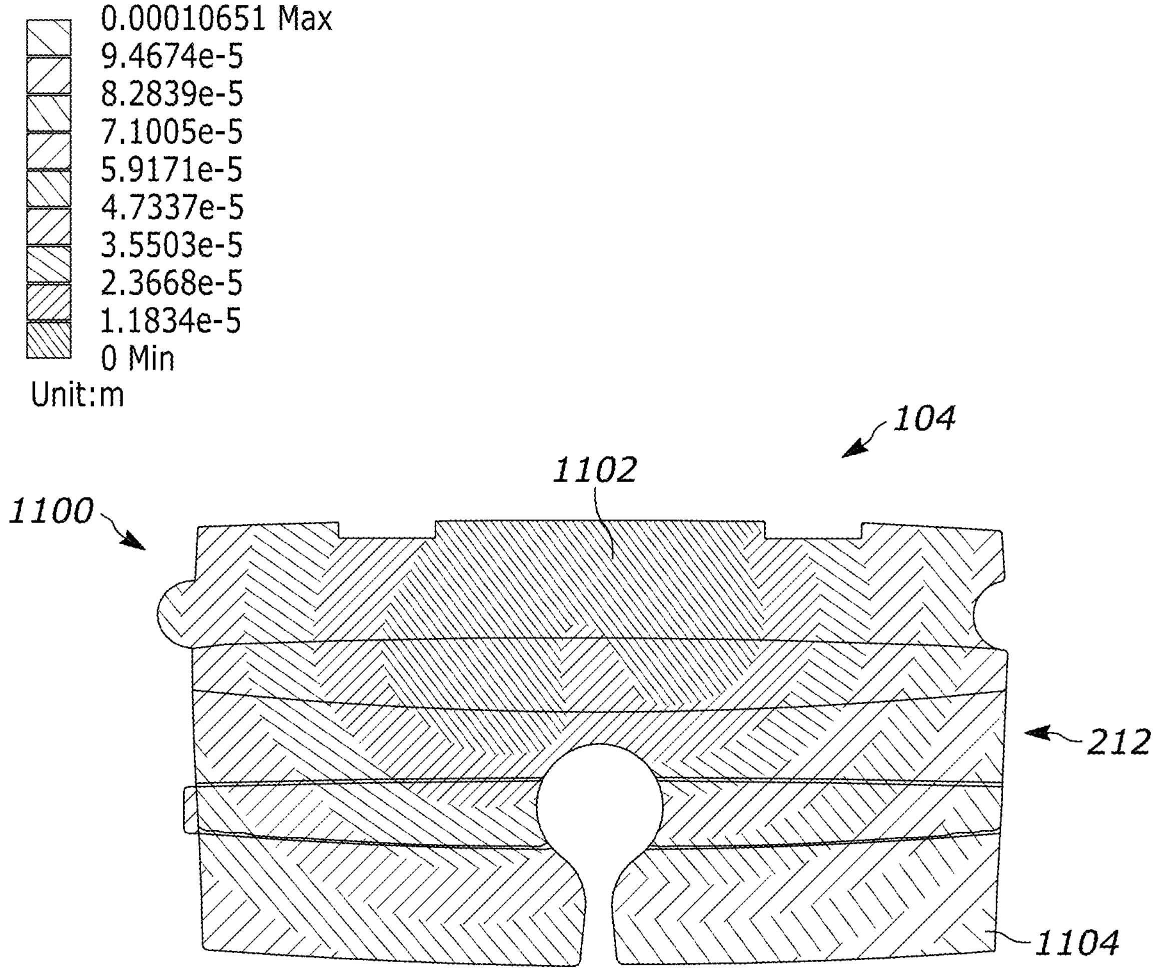
FIG. 11B depicts an exemplary deformation compliance of a link having a link geometry shown in FIGS. 3A, 3B, 3C, and 3D in accordance with some embodiments.

In some embodiments, the rigidizable insertion tool 100 includes a tension assembly 600. The tension assembly is used to alter the shape of the links including any deformable links in the link assembly. The tension assembly 600 can apply tension and/or pulling force on at least one line 106 to close a gap 110 between links (e.g., between a link 104 and a neighboring link 112) and pull them tightly together so that the plurality of links 102 may form into a predetermined shape. In some aspects, the line 106 may include a wire and/or a cable. In some embodiments, the predetermined shape can be defined by a link geometry (e.g., shapes of the deformable link 104 shown in FIGS. 2A, 2B, 3A, 3B, 3C, and 3D). For example, a link geometry having an opening 304 through a deformable portion 204 as shown in FIG. 3C alters the deformability of various portions of the deformable link 104 when the deformable link 104 is under tension as illustrated in FIGS. 11A-11B. As such, having the opening 304 through the deformable portion 204 allows the deformable link 104 to bend more since the gap created by the opening 304 allows the portion of the deformable link 104 under tension to be axially displaced further until the gap narrows and the portion under tension contacts the other portion of the deformable link 104.

In some embodiments, the at least one line 106 may include a line cap (not shown) at a tip link 114 for securing in-place the at least one line 106 enabling the tension assembly 600 to apply tensioning force in the rigidizable insertion tool 100.

Figure 6A:
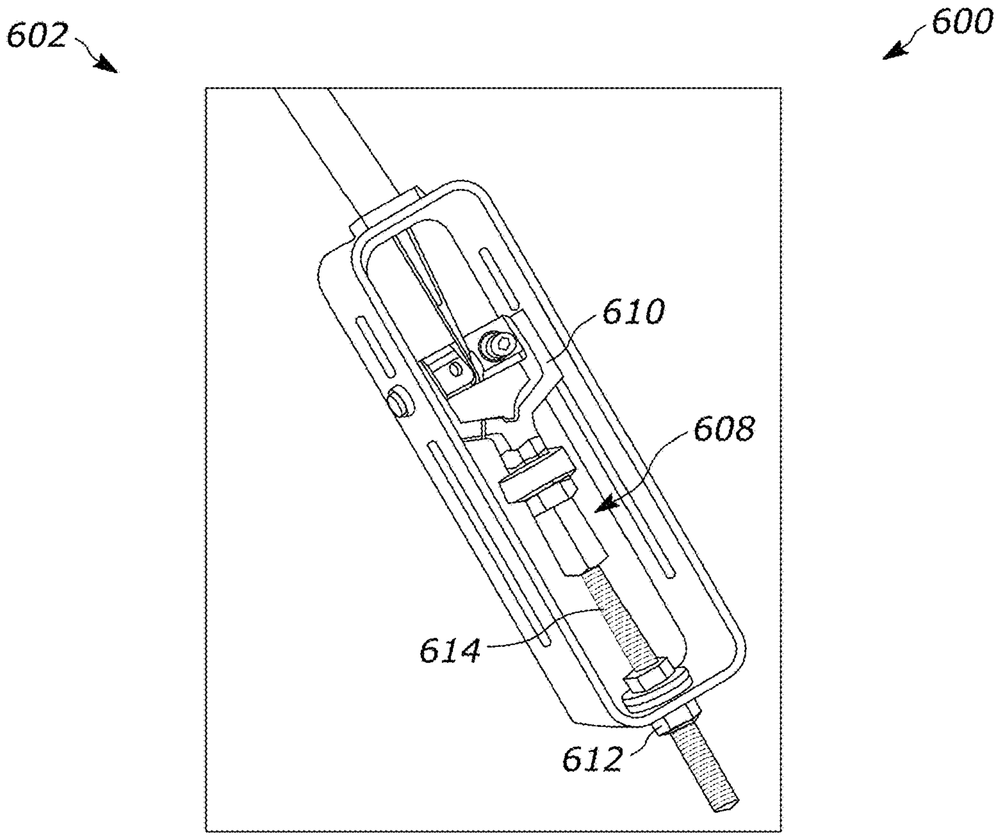
FIGS. 6A, 6B, and 6C depict exemplary tension assemblies in accordance with some embodiments.
Figure 6B:
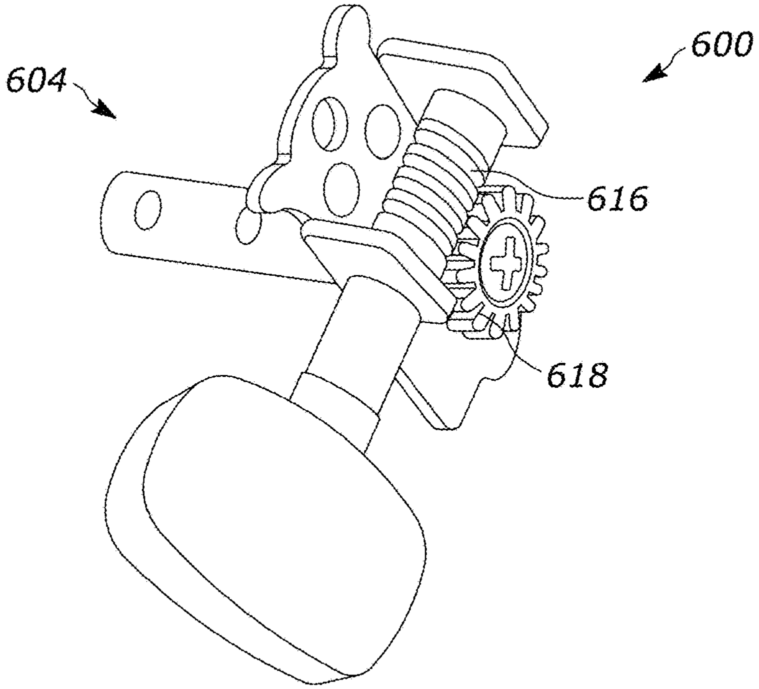
Figure 6C:
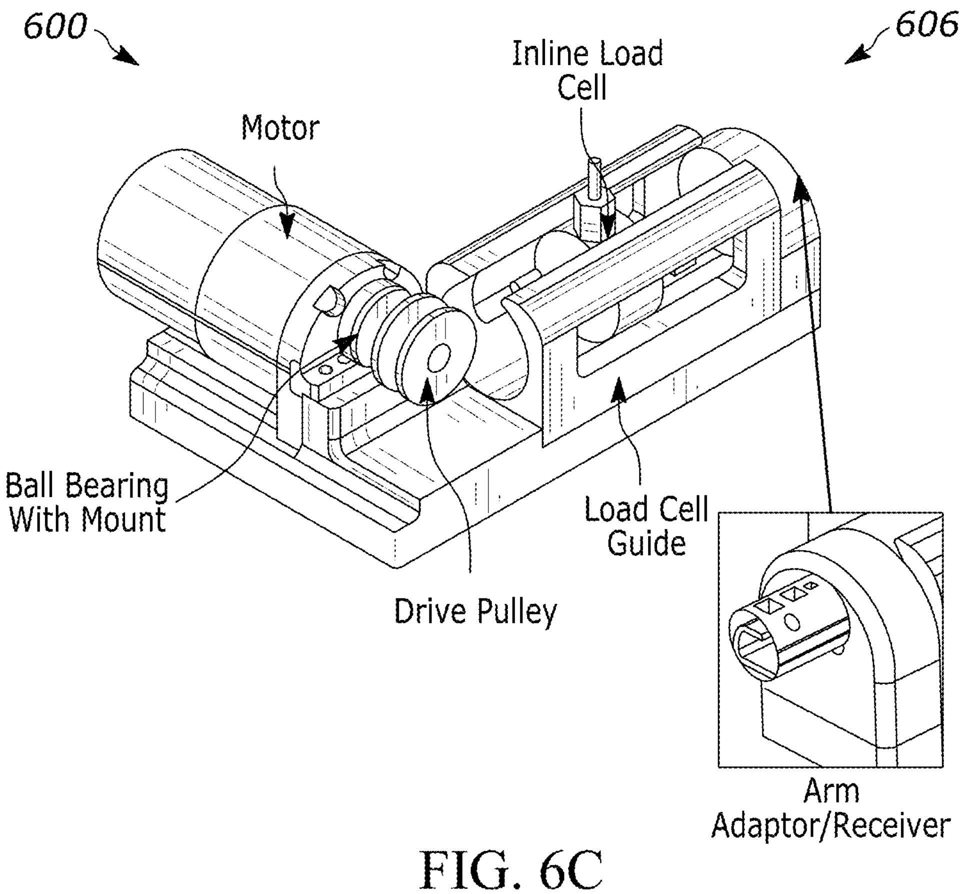

FIGS. 6A-6C depict exemplary tension assemblies 600 (e.g., 602 of FIGS. 6A, 604 of FIG. 6B, and 606 of FIG. 6C) in accordance with some embodiments. It will be appreciated that some parts of the tension assemblies 600 are not shown in FIGS. 6A-6C since an ordinary person skilled in the art would understand the tension assemblies 600 being discussed, the corresponding parts associated with such an tension assembly, and how to couple the tension assembly with the line 106 to allow the tension assembly to apply tensioning force on the plurality of links 102.

In an illustrative non-limiting example, the tension assemblies 600 may include a screw/leadscrew based tensioner 602 as shown in FIG. 6A. In some embodiments, the screw/leadscrew based tensioner 602 may include a lead screw-based linear sliding mechanism 608 coupled to the line 106. For example, the line 106 may be tied, connected, or coupled to a slider 610 of the screw/leadscrew based tensioner 602. In some embodiments, as a lead screw 614 of the screw/leadscrew based tensioner 602 gets pulled back by rotating a nut 612 of the screw/leadscrew based tensioner 602.

In another illustrative non-limiting example, the tension assemblies 600 may include a worm gear tensioner 604 as shown FIG. 6B. In some embodiments, the worm gear tensioner 604 may include a gear 618 and a worm screw 616. For example, the line 106 may be attached to the gear 618 and the tension can be set by turning the worm screw 616.

In another illustrative non-limiting example, the tension assemblies 600 may include a motor-driven active tensioning mechanism 606 as shown in FIG. 6C. In some embodiments, the motor-driven active tensioning mechanism 606 may include a motor (e.g., a gear motor), an inline load cell, a ball bearing with mount, a drive pulley, a load cell guide, and/or a link adaptor/receiver. In an illustrative non-limiting example, the motor-driven active tensioning mechanism 606 includes a motor pulley assembly (e.g., combination of the drive pulley and the gear motor) with the line 106 attached to the drive pulley. For example, as the motor rotates to wind the line 106 onto the drive pulley, the line 106 may get pulled/tensioned. In some embodiments, the tension can be actively controlled or adjusted by controlling the motor, either using position control (e.g., indirect tension control) or torque control (direct tension control) of the gear motor. In some embodiments, inline tension measurement, such as an inline load cell, can be added to enable closed loop control of tension.

In some embodiments, the tension assembly 600 applies a first tensioning force on the plurality of links 102 to actuate the plurality of links 102 from a relaxed state (as shown in FIG. 1A) to a rigidized state (as shown in FIG. 1B) having a first predefined shape. In some embodiments, in a relaxed state, there is a gap 110 between the deformable link 104 and the link 112 as shown in FIG. 1A. In some embodiments, in a rigidized state, the gap 110 is substantially narrowed as shown in FIG. 1B relative to the gap 110 as shown in FIG. 1A. In some embodiments, the links 104 include end features (e.g., protrusion and indentations) and in the rigidized state, the end features of adjacent links contact and engage each other such that relative rotation and pivot of the links are limited by the end features.

Figure 7:
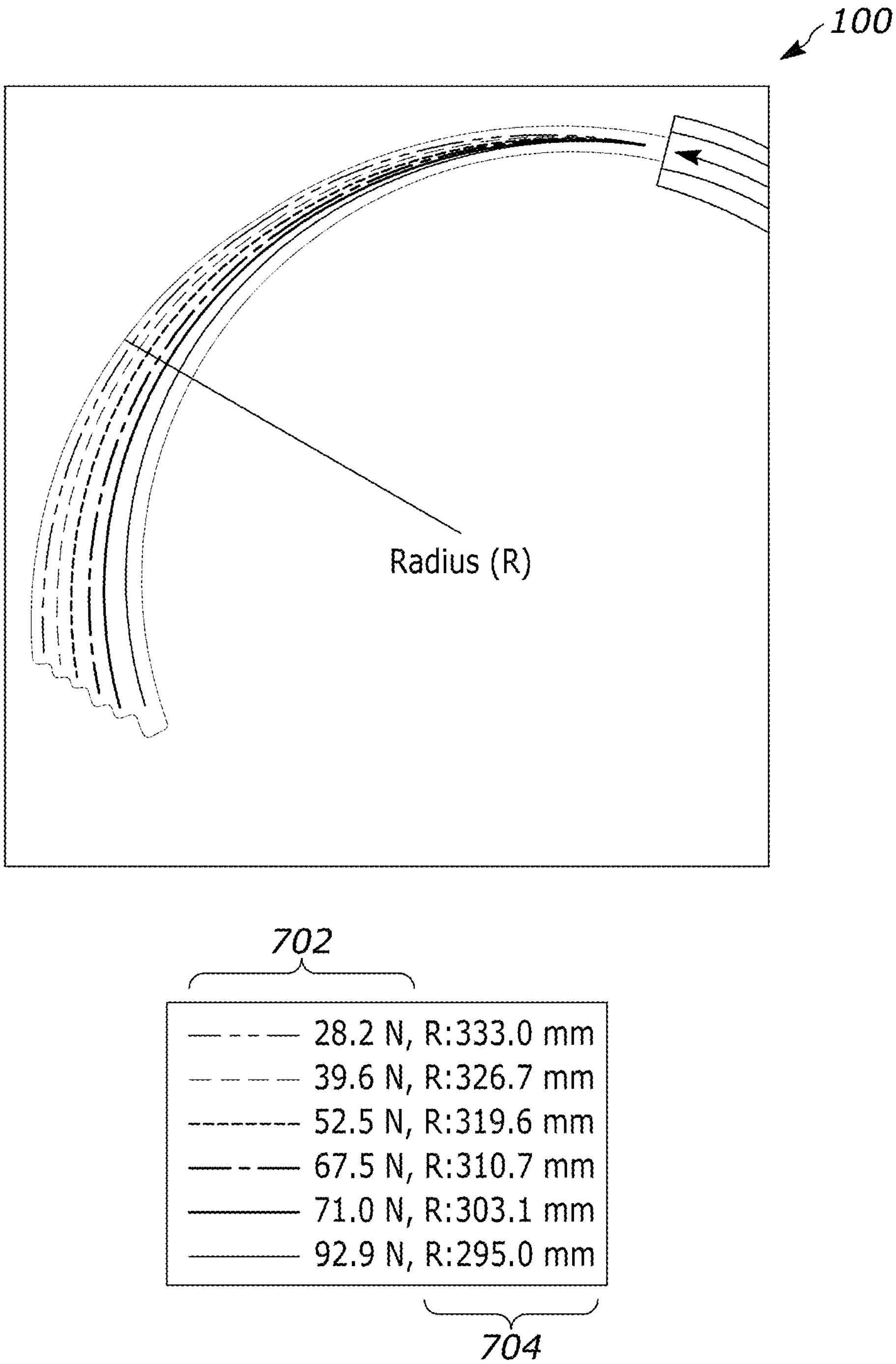
FIG. 7 depicts various applied tension forces and corresponding bending radius of a rigidizable insertion tool in accordance with some embodiments.
Figure 8:
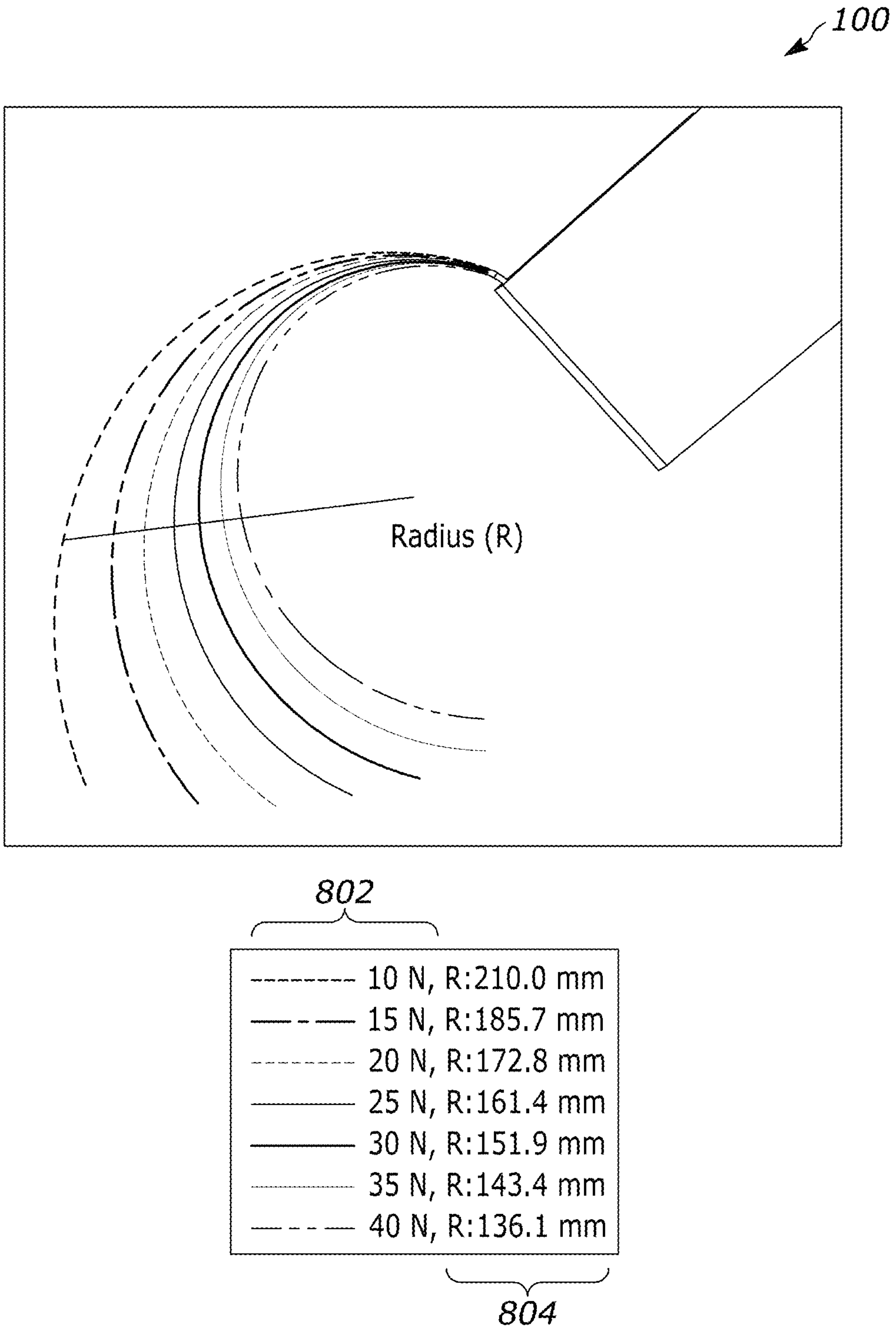
FIG. 8 depicts various applied tension forces and corresponding bending radius of a rigidizable insertion tool in accordance with some embodiments.

In some embodiments, the screw/leadscrew based tensioner 602, the worm gear tensioner 604, and/or the motor-driven active tensioning mechanism 606 may apply a second tensioning force greater than the first tensioning force on the plurality of links 102 while in the rigidized state to cause structural deformation of the at least one link 104 and change a shape of the plurality of links 102 from the first shape. The second tensioning force can change the shape from the first shape to a second shape as illustrated in FIGS. 7 and 8. In particular, FIGS. 7 and 8 illustrate various applied tension forces and corresponding bending radius of a rigidizable insertion tool 100 depicting the change in the shape of the plurality of links 102 from the first shape to the second shape as the applied tension force is varied. In some embodiments, the second tensioning force is based on a stored value of forces applied to change the shape of at least one link 104 to a predetermined shape. For example, a memory (e.g., network storage/cloud storage, hard drives, and/or any types of memory storage devices capable of storing electronic data) may store data associated with a plurality of tension force values and the corresponding resulting bend radii when those tension forces are applied to the plurality of links 102 (e.g., FIGS. 7 and 8 depict various a number of tension force 702, 802 and corresponding radius 704, 804).

In some embodiments, the first tensioning force may correspond to the initial tensioning of the lines 106 from a relaxed state to a rigidized state. The second tension force may correspond to a tension force applied to deform the plurality of links 102 into a particular shape having a particular radius (e.g., application of tension force 10 Newtons (N) corresponds to bending of the plurality of links 102 into a shape having a radius 210 millimeters (mm) as shown in FIG. 8). In some embodiments, a single tensioning force maybe applied to achieve the rigidization of the lines 106 from a relaxed state to a rigidized state forming a particular shape.

In some embodiments, one or more subsequent tensioning forces are applied until a desired shape of the plurality of links 102 is achieved to perform maintenance, repair, and/or inspection operations. In one example, a single subsequent tensioning force is applied and the final desired shape and curvature of the links is achieved by application of this single force. In another example, multiple tensioning forces are applied moving the links 102 stepwise from an initial shape and curvature to intermediate shapes and curvatures, and then to the final desired shape and curvature.

For example, the stored value of forces may include a plurality of tension forces 702 each with a corresponding radius 704 as shown in FIG. 7. Each radius 704 is an approximation of the resulting radius achieved when a corresponding tension force 702 is applied. In some embodiments, the resulting radius may account for the corresponding radius and at least either or both of gravity and friction acting on the rigidizable insertion tool. The radius corresponds to a given curvature assumed by the links 102 best approximating the curve when a particular tension force is applied to the links 102. The radius is measured from a predetermined point selected by a user. FIG. 7 shows the links assuming positions having different radii with the different radii being achieved by the application of different forces to the links 102. Generally speaking, the greater the radius achieved, the less tight the curvature of the links 102, and the smaller the radius achieved, then the greater (tighter) the curvature. As shown in FIG. 7, a radius of 330 mm is obtained when a force of 28.2 N is applied to the links 102. In some aspects, smaller radii are achieved by applying greater forces and larger radii are achieved by applying smaller forces. The forces can be applied using the devices and mechanisms described elsewhere herein. It will be appreciated that an ordinary person skilled in the art would understand and know how to choose or select a radius of curvature based on the curvature of the bend achieved by the links 102 when a particular tension force is applied based upon the results desired.

In some embodiments, each stored value of forces may be associated with a corresponding predetermined shape of the plurality of links 102 in a rigidized state. The corresponding predetermined shape may be defined by a corresponding radius 704. For example, the predetermined shape may be formed when the plurality of links 102 is rigidized to have a corresponding radius 704 as shown in FIG. 7. Alternatively, the stored value of forces may include a plurality of tension forces 802 each with a corresponding radius 804 as shown in FIG. 8. Similarly, a predetermined shape may be formed when the plurality of links 102 is rigidized to have a corresponding radius 804 as shown in FIG. 8. Each radius 804 is an approximation of the resulting radius achieved when a corresponding tension force 802 is applied. In some embodiments, the resulting radius may account for the corresponding radius and at least either or both of gravity and friction acting on the rigidizable insertion tool. For example, the predetermined shape may be defined by a corresponding radius 804. In an illustrative non-limiting example, the tension assembly 600 may apply subsequent tensioning force based on repeatability of tension-position correlation according to stored values as described in FIGS. 7 and 8 above (e.g., each of the tension forces 702, 802 is subsequently applied until a desired shape of the plurality of links 102 is achieved) and/or based on real-time feedback information detected by one or more tool position sensors described herein (e.g., the tool position sensor 920 of FIG. 9).

Figure 9:
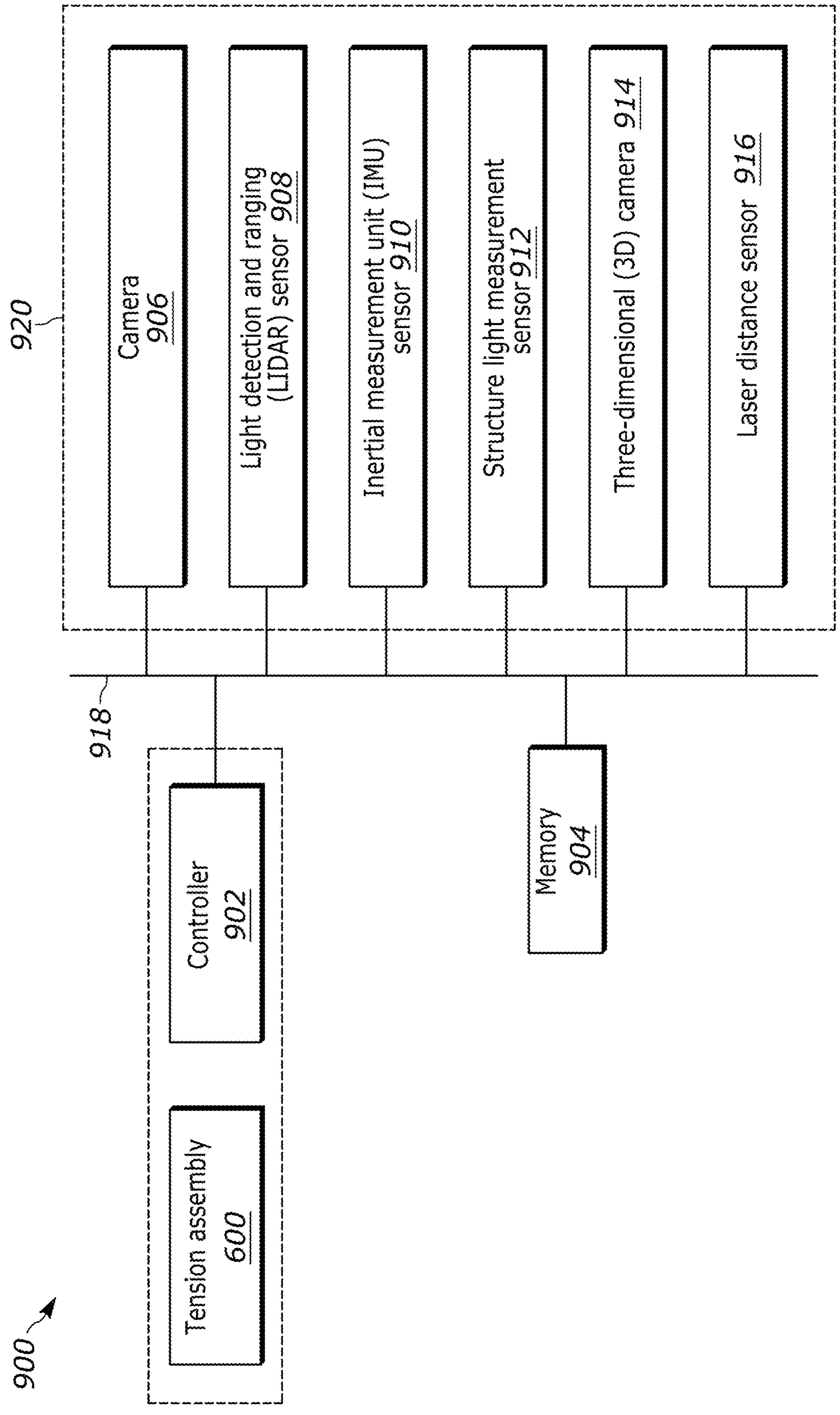
FIG. 9 is a block diagram of a rigidizable insertion tool system in accordance with some embodiments.

FIG. 9 illustrates a block diagram of a rigidizable insertion tool system 100 in accordance with several embodiments. In some embodiments, the rigidizable insertion tool system 100 may include a controller 902 and/or a memory 904. For example, the stored value of forces applied to change the shape of at least one link 104 to the predetermined shape may be stored in the memory 904.

In some embodiments, the controller 902 may include one or more processors, a microcontroller (MCU), a microprocessor, a programmable logic controller (PLC), and/or a dedicated integrated circuit (IC) designed for control purposes, to name a few. In some embodiments, the rigidizable insertion tool system 100 may include one or more tool position sensors 920. For example, the one or more tool position sensors 920 may include a camera 906, a light detection and ranging (LIDAR) sensor 908, an inertial measurement unit (IMU) sensor 910, a structured light measurement sensor 912, a three-dimensional (3D) stereo camera 914, and/or a laser distance sensor 916. In some embodiments, the sensor data output by the one or more tool position sensors 920 (i.e., feedback data) to the controller 902 via a communication network 918 may be used by the controller 902 to determine whether the applied second tensioning force (or subsequent tensioning force) changed the shape of the plurality of links 102 from a first shape to a second shape. In some embodiments, the communication network 918 may include Internet, wired network and/or wireless network.

In one example of the operation of the system of FIG. 9, the controller 902 causes the tension assembly 600 to apply a subsequent tensioning force based on the feedback data received from one or more tool position sensors 920. For example, the controller 902 processes the feedback data and determines that the desired predetermined shape of the plurality of links 102 has not been achieved since the bending radius of the plurality of links 102 is determined to be less than a corresponding bending radius. In some embodiments, an application of the second tensioning force may result in a radial bending of the plurality of links 102 between 60% to 100% of an original or an initial radius of a rigidized insertion tool 100. In some embodiments, a value of the second tensioning force may include a range between 100% to 500% of the first tensioning force. In some embodiments, the controller 902 may continuously vary a tensioning force applied by the tension assembly 600 according to the length of the rigidizable insertion tool 100 deployed into a cavity of the inspected component, allowing the tip of the rigidizable insertion tool 100 to travel a complex three-dimensional path while the tool in inserted into the inspected component. In some embodiments, as shown in FIG. 12, the controller 902 may sequentially vary a tensioning force (e.g., starting at the minimum tension force) applied by the tension assembly 600 in accordance with the tension forces 702 and/or the tension forces 802 until a desired shape of the plurality of links 102 is achieved.

Figure 13:
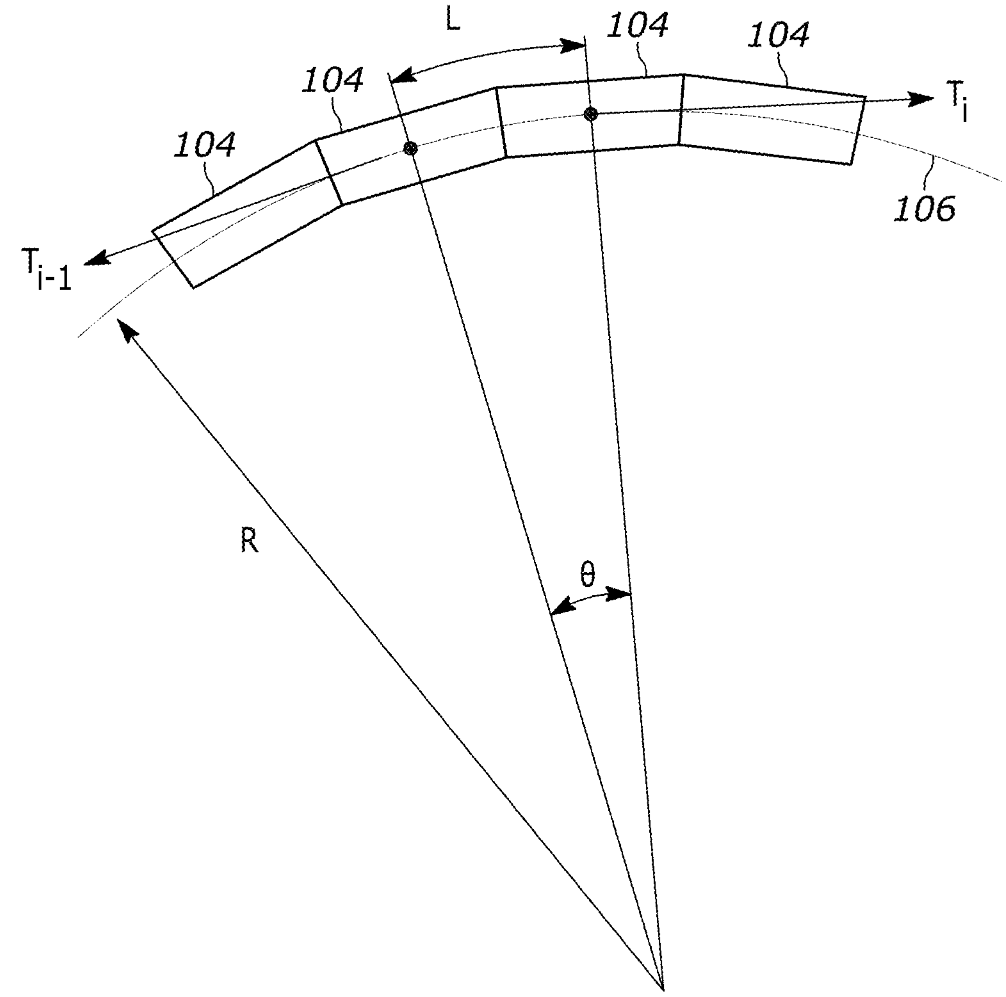
FIG. 13 depicts the maximum amount of change of tension in the lines over a given length of the insertion tool due to friction.

In some embodiments, as shown in FIG. 13, the controller 902 may form and send an electronic control signal (or signals) to the tension assembly 600 that control/cause the tension assembly 600 to continuously vary a tensioning force applied by the tension assembly 600 according to the length of the rigidizable insertion tool 100 deployed into that cavity to create a continuously varying tension gradient along the deployed length of the rigidizable insertion tool

100, compensating for the orientation with respect to gravity of the deployed portion of the rigidizable insertion tool 100 and therefore allowing the rigidizable insertion tool 100 to have a desired shape such as a simple circle with a desired radius. The maximum amount of change of tension ($T_i - T_{i-1}$) in the lines 106 over a given length L of the rigidizable insertion tool 100 depends on the coefficient of friction $\mu$ between the lines 106 and links 102, and the change in angle $\theta$ of the lines 106 along the length of the rigidizable insertion tool 100. For a rigidizable insertion tool 100 with an arc radius R, the maximum change in tension is given by: $T_i - T_{i-1} = T_{i-1}(e^{\mu\theta} - 1)$.

For a circular arc, the length $L = R\theta$, therefore $T_i - T_{i-1} = T_{i-1}(e^{\mu L/R} - 1)$. The required change in tensioning force per unit length to obtain a rigidizable insertion tool of a certain circular arc radius can be calculated for example using a free body diagram of each link 102 for a given link compliance. It is necessary to evaluate the rate of change in line tension, and it may in some cases be necessary to choose materials or coatings for one or both of the links 102 and lines 106 in order to obtain a sufficient coefficient of friction at their interfaces to sustain the required linear rate of change in line tension over a given length of a rigidizable insertion tool 100.

Figure 2A:
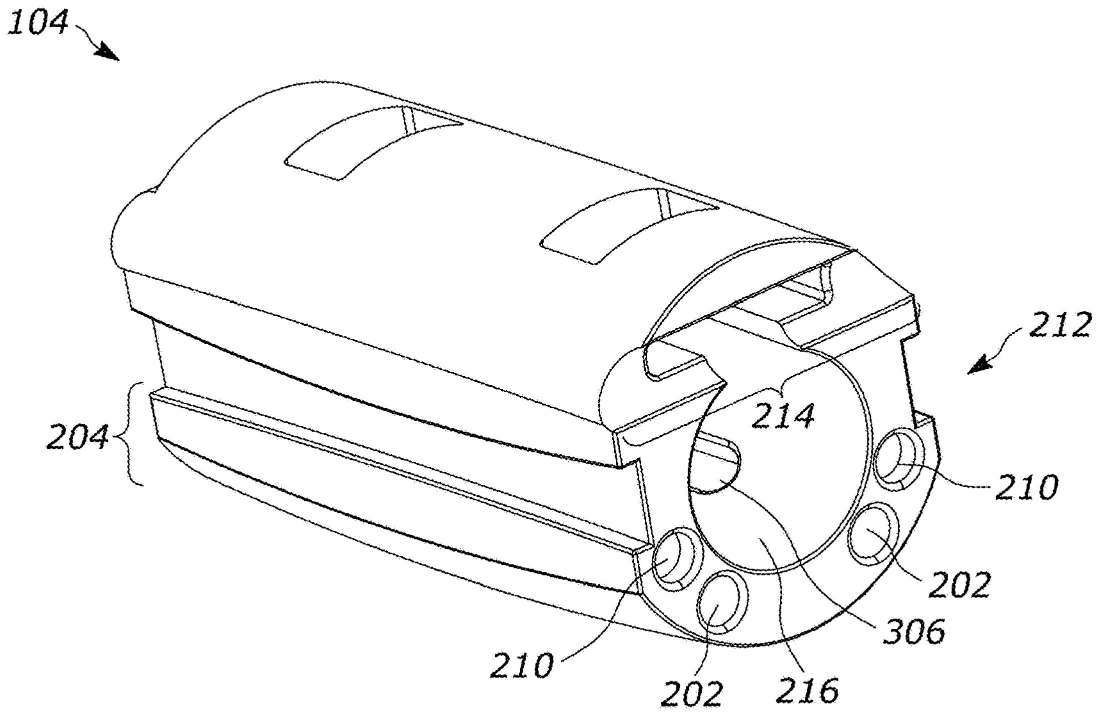
FIGS. 2A and 2B are perspective views of an exemplary link of the rigidizable insertion tool in FIGS. 1A-1B in accordance with some embodiments.
Figure 2B:
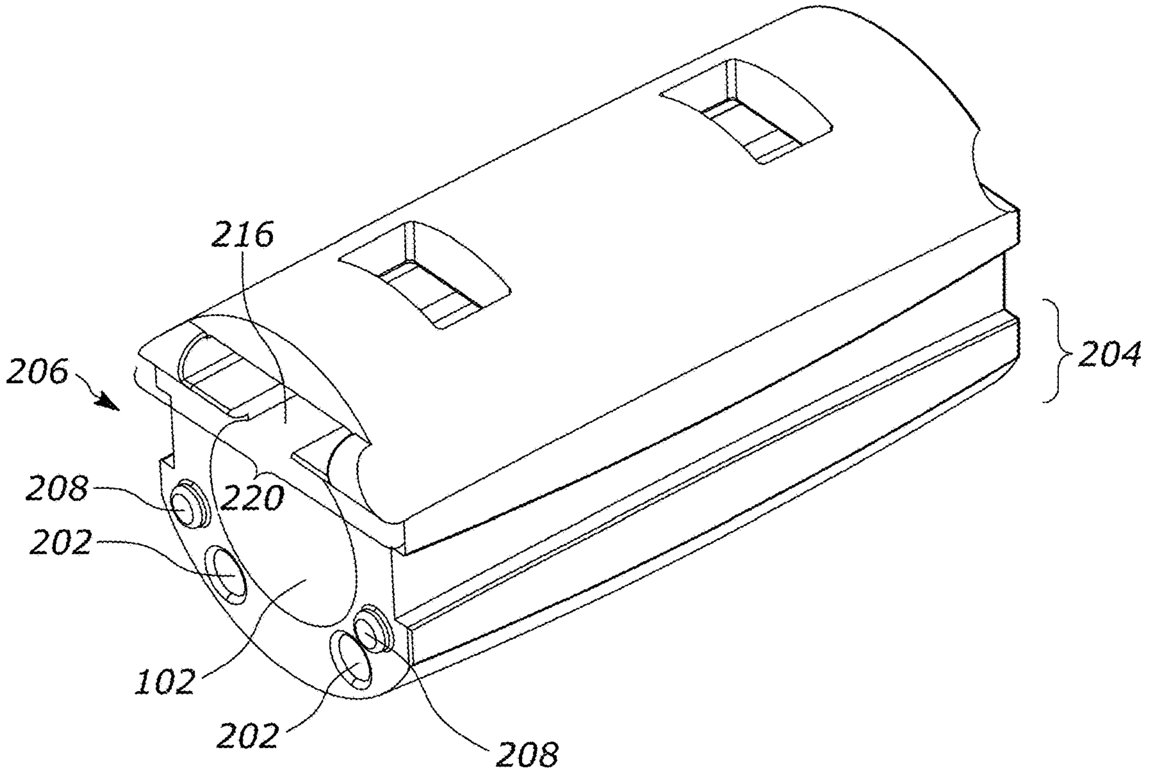

Referring now to FIGS. 2A and 2B, perspective views of opposite ends of the same exemplary link of the rigidizable insertion tool in FIGS. 1A-1B are described. In some embodiments, one or more features shown in FIGS. 2A and 2B are common to the links (deformable and non-deformable links). In some embodiments, one or more features shown in FIGS. 2A and 2B are only applicable to the deformable links. Those features only applicable to the deformable links are specifically stated herein. As shown, the link 104 includes one or more line channels 202 extending axially within a deformable portion 204 of the link 104. In some embodiments, the deformable portion 204 may correspond to the portion of the deformable link that is more deformable relative to the rest of the deformable link due to the link geometry present in that portion of the deformable link. In some embodiments, the tension assembly 600 includes one or more lines 106 extending through the one or more line channels 202 of the link 104 to apply tension. In some embodiments, a first end 206 of the link 104 includes one or more protrusions 208 to engage with one or more indentions 210 of a neighboring link 112 to align the link 104 with the neighboring link 112 and to limit relative movement of the link 104 and the neighboring link 112 when the first tensioning force is applied to rigidize the tool. Alternatively or in addition, the link 104 may include a protruding portion 220 of pivot feature and a socket portion 214 of pivot feature of the link 104. In some embodiments, the protruding portion 220 is at a first end 206 while the socket portion 214 is at a second end 212 of the link 104. In some embodiments, in the serial arrangement of each link 104 in the rigidizable insertion tool 100, the second end 212 of each link 104 of the plurality of links 102 is facing the tension assembly 600 while the first end 206 of each link 104 is facing away from the tension assembly 600 or facing towards a distal end of the rigidizable insertion tool 100. In some embodiments, in the serial arrangement of each link 104 in the rigidizable insertion tool 100, the first end 206 of each link 104 of the plurality of links 102 is facing the tension assembly 600 while the second end 212 of each link 104 is facing away from the tension assembly 600 or facing towards a distal end of the rigidizable insertion tool 100.

Alternatively or in addition, a link 104 may include a cavity 216. In some embodiments, the cavity 216 may receive a connector (e.g., fluid, power, torque, and/or data connection) for an implement such as one or more of a camera 906, a light detection and ranging (LIDAR) sensor 908, an inertial measurement unit (IMU) sensor 910, a structured light measurement sensor 912, a three-dimensional (3D) stereo camera 914, and/or a laser distance sensor 916. In some embodiments, the implement may include a servicing or repair tool such as a spray tool, a laser, a camera, brushes, a drilling tool, a grinding tool, a light source, or a liquid dispensing head.

Figure 4:
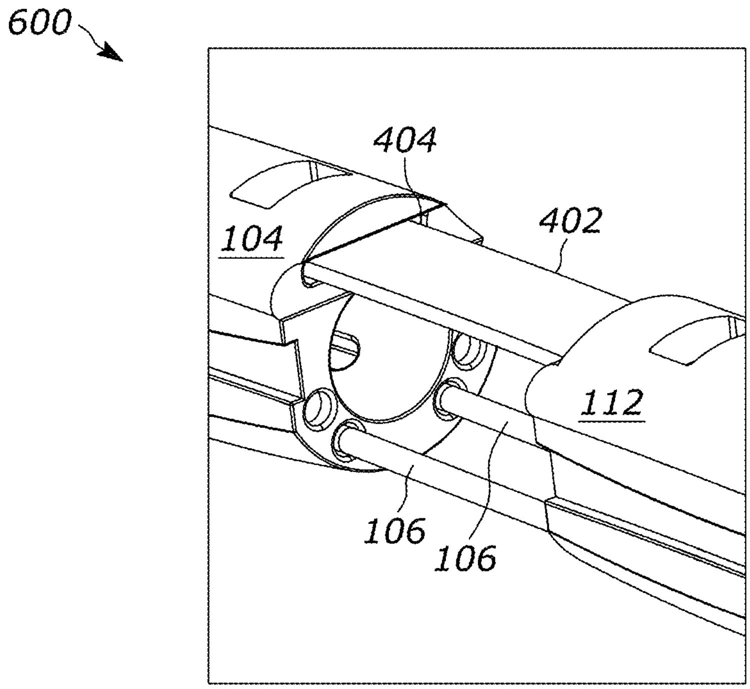
FIG. 4 depicts lines and a spine between links of a rigidizable insertion tool in accordance with some embodiments.

Referring now to FIG. 4. FIG. 4 depicts a rigidizable insertion tool 100 including lines 106 and a spine 402 in accordance with some embodiments. In some embodiments, the spine 402 may run through a spine channel 404 of a link 104 and a spine channel 404 of a neighboring link 112. For example, the spine 402 may run through all spine channels 404 of all links 104 of the plurality of links 102. In some embodiments, the spine 402 may serially keep the links in the plurality of links 102 in place.

Figure 3A:
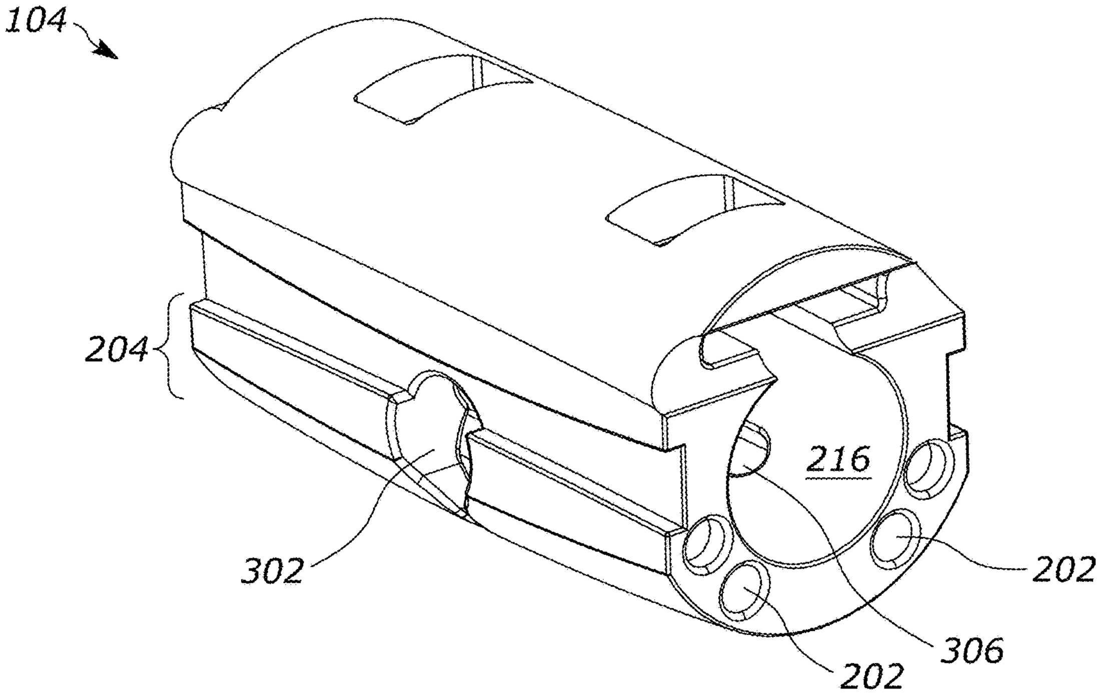
FIGS. 3A and 3B are perspective views of an exemplary link having a cross-sectional channel in accordance with some embodiments.
Figure 3B:
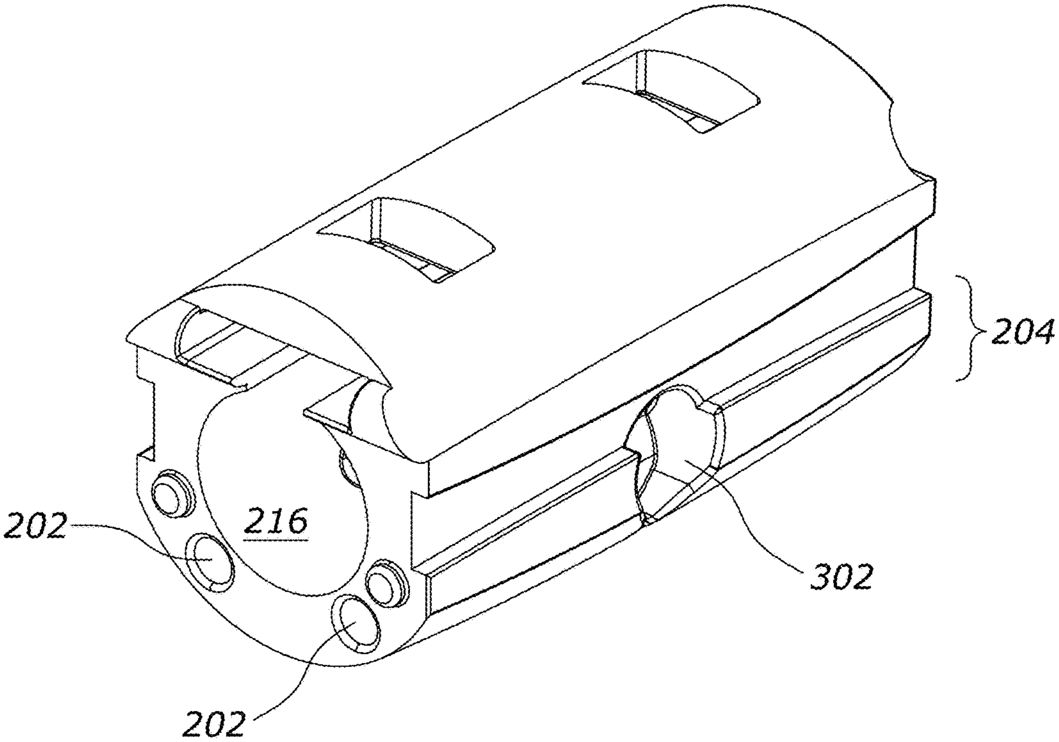
Figure 3C:
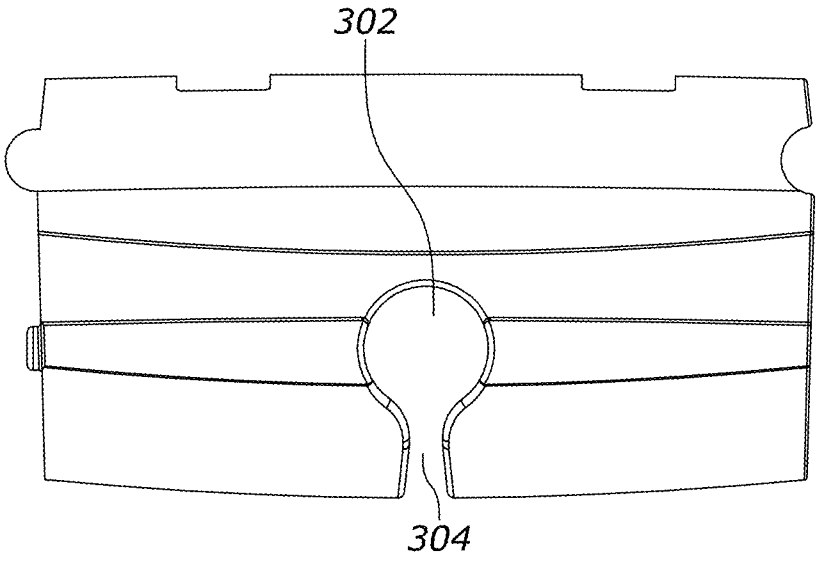
FIG. 3C is a side view of the exemplary link in FIGS. 3A and 3B in accordance with some embodiments.
Figure 3D:
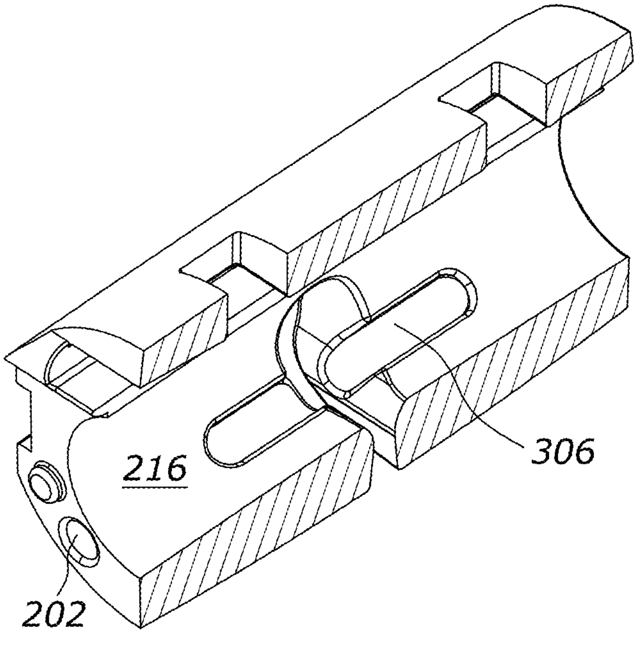
FIG. 3D is a cross-sectional view of the exemplary link in FIGS. 3A and 3B in accordance with some embodiments.

Referring now to FIGS. 3A, 3B, 3C, and 3D. FIGS. 3A and 3B are perspective views of opposite ends of an exemplary link 104 having a cross-sectional channel 302 in accordance with some embodiments. FIG. 3C is a side view of the exemplary link 104 in FIGS. 3A and 3B in accordance with some embodiments. FIG. 3D is a cross-sectional view of the exemplary link 104 in FIGS. 3A and 3B in accordance with some embodiments. In some embodiments, one or more features shown in FIGS. 3A, 3B, 3C, and 3D are common to the links (deformable and non-deformable links). In some embodiments, one or more features shown in FIGS. 3A, 3B, 3C, and 3D are only applicable to the deformable links, such as a cross-sectional channel 302 and an opening 304 shown in FIG. 3D. In some embodiments, a portion of the one or more line channels 202 includes an opening (e.g., the cross-sectional channel 302 and/or the opening 304) extending to a cavity 216 of the at least one deformable link 104. Those features only applicable to the deformable links are specifically stated herein. In some embodiments, the cross-sectional channel 302 and the opening 304 allow the deformable link 104 to bend further relative to another link that does not have one or more of these features. For example, having the opening 304 (shown in FIG. 3C) through the deformable portion 204 (shown in FIGS. 2A, 2B, 3A, and 3B) allows the deformable link 104 to bend more since the gap created by the opening 304 allows the portion of the deformable link 104 under tension to be axially displaced further until the gap narrows and the portion under tension contacts the other portion of the deformable link 104. Alternatively or in addition, a link 104 may include a cross-sectional channel 302 extending laterally through the link 104. In some embodiments, the cross-sectional channel 302 may include an opening 304 through the deformable portion 204. Alternatively or in addition, a portion of the one or more line channels 202 (e.g., in the link geometry shown in FIGS. 2A and 2B and/or in the link geometry shown in FIGS. 3A, 3B, 3C, and 3D) may include an opening 306 that extends to the cavity 216 of the link 104. In some embodiments, the opening 306 exposes a portion of the one or more line channels 202. In some embodiments, the plurality of links 102 having at least one link 104 including the cross-sectional channel 302 may be tensioned to one or more predetermined shapes based on the plurality of tension forces 802 and the corresponding radius 804 in FIG. 8. In some embodiments, the plurality of links 102 having at least one link 104 not including the cross-sectional channel 302 may be tensioned to one or more predetermined shapes based on the plurality of tension forces 702 and the corresponding radius 704 in FIG. 7.

In some embodiments, each of the plurality of links 102 may include a cross-sectional channel 302. In some embodiments, only a subset of the plurality of links 102 includes a cross-sectional channel 302 and while others have no cross-sectional channel 302 (e.g., the link 104 in FIG. 2). In some embodiments, the deformable portion 204 may correspond to the portion of the deformable link that is more deformable relative to the rest of the deformable link due to the link geometry being present in that portion of the deformable link, such as the cross-sectional channel 302 and the opening 304.

Figure 5:
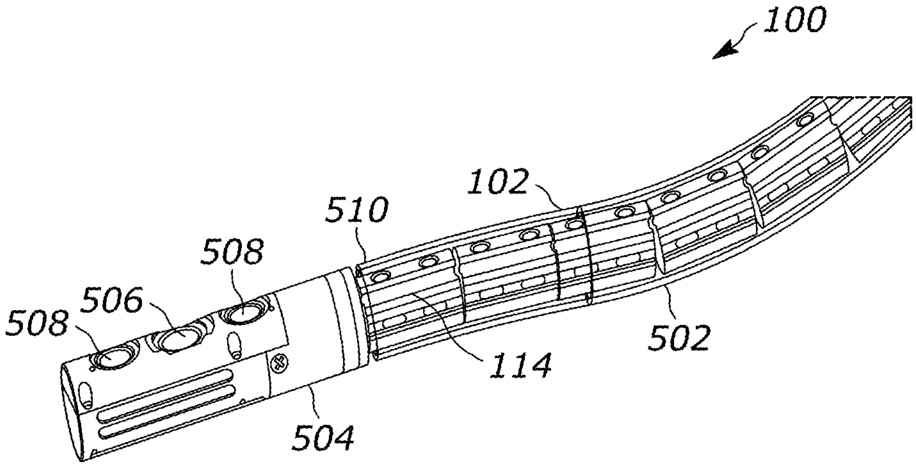
FIG. 5 depicts a rigidizable insertion tool inside an insertion tube in accordance with some embodiments.

Referring now to FIG. 5. FIG. 5 depicts a rigidizable insertion tool 100 inside an insertion tube 502 in accordance with some embodiments. An illustrative non-limiting example of an insertion tube 502 may include a proximal end (not shown) and a distal end 510 and having a length and/or curvature sufficient to guide the plurality of links 102 into a cavity of an engine. In some embodiments, the insertion tube 502 may include a tube sliding plain bearing feature positioned at least partially along a wall of the insertion tube 502 to prevent the plurality of links 102 from becoming misaligned or twisted out of orientation when being inserted through the insertion tube 502.

In some embodiments, the plurality of links 102 is movable through the insertion tube 502. The insertion tube 502 may maintain the various shapes of the links within the insertion tube 502 while the shape of the links that have extended out of the insertion tube is shaped by the tensioning forces. In some embodiments, the rigidizable insertion tool 100 may be coupled to an end effector 504. In some embodiments, the end effector 504 may include a camera 506 and/or an LED 508, to name a few. In some embodiments, the end effector 504 may include spray tools, a laser, a camera, brushes, a drilling tool, a grinding tool, a light source, or a liquid dispensing head. In some embodiments, the end effector 504 may be one or more fixed and/or detachable accessories to facilitate inspection and/or repair of inside an engine (e.g., an aircraft engine and/or any engine having cavities). In some embodiments, the end effector 504 may be attached or coupled to a front of a tip link 114 shown in FIG. 1A of the plurality of links 102 and stays out of the insertion tube 502. For example, the tip link 114 may correspond to a link relative to the links of the plurality of links 102 that is the most distal from the tension assembly 600 (FIG. 1A).

Figure 10:
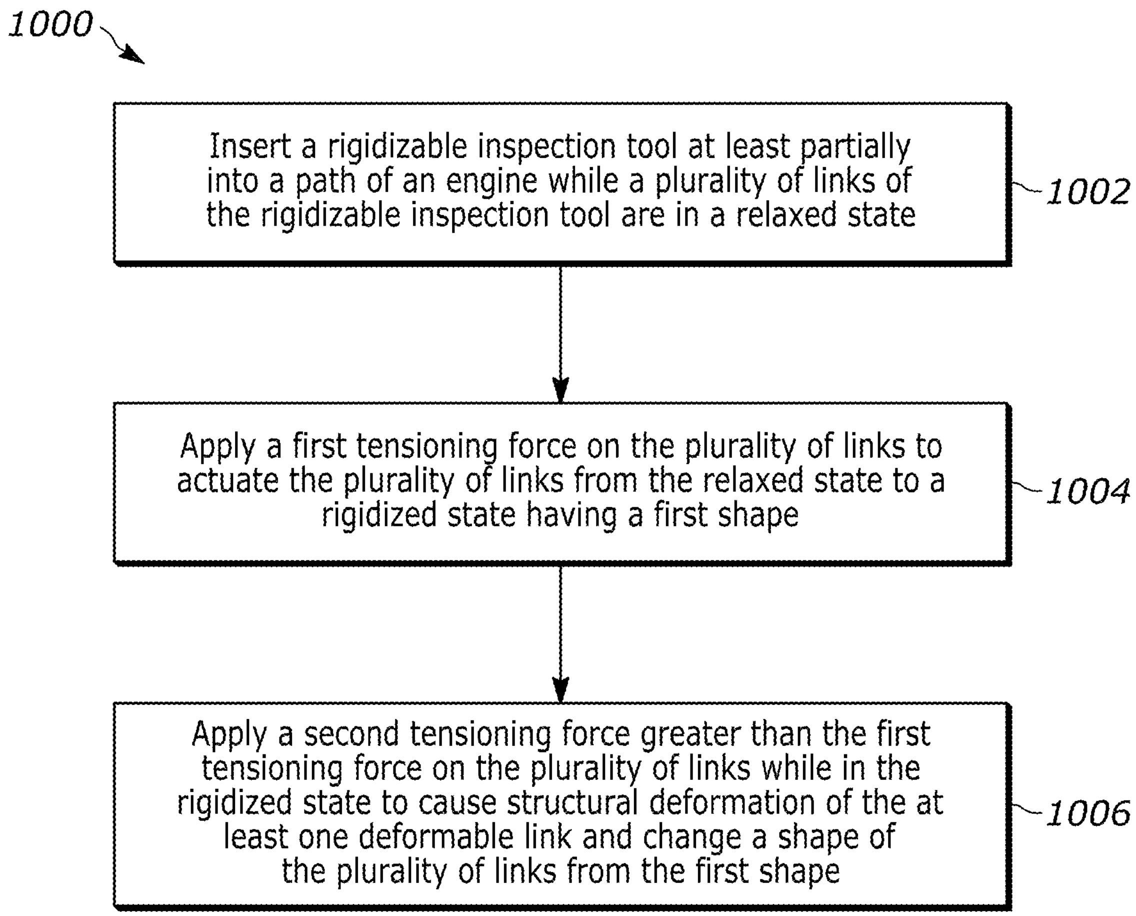
FIG. 10 shows a flow diagram of an exemplary method for operating a rigidizable insertion tool in accordance with some embodiments.

Referring now to FIG. 10. FIG. 10 shows a flow diagram of an exemplary method 1000 for operating a rigidizable insertion tool 100 within an engine defining a path in accordance with some embodiments. In some embodiments, the method 1000 includes, at step 1002, inserting the rigidizable insertion tool 100 at least partially into a path of an engine while a plurality of links 102 of the rigidizable insertion tool 100 are in a relaxed state. The rigidizable insertion tool 100 may include the plurality of links 102 arranged in a sequence. In some embodiments, the plurality of links 102 includes at least one link 104 that is structurally deformable. Alternatively or in addition, the rigidizable insertion tool 100 may include a tension assembly 600.

In some embodiments, the method 1000 includes, at step 1004, applying, by the tension assembly 600, a first tensioning force on the plurality of links 102 to actuate the plurality of links 102 from the relaxed state to a rigidized state having a first shape.

In some embodiments, the method 1000 includes, at step 1006, applying, by the tension assembly 600, a second tensioning force greater than the first tensioning force on the plurality of links 102 while in the rigidized state to cause structural deformation of the at least one link 104 and change a shape of the plurality of links 102 from the first shape. The second tensioning force may change the shape from the first shape to a second shape as described herein. In some embodiments, one or more subsequent tensioning forces may be applied that may further change the shape of the plurality of links 102 from the second shape to one or more subsequent shapes. In some embodiments, the rigidizable insertion tool 100 may be withdrawn from an engine by gradually reducing the tension applied by the tension assembly 600 as the rigidizable insertion tool 100 is pulled out the engine.

Referring now to FIGS. 11A and 11B. FIG. 11A depicts an exemplary deformation compliance 1100 of the deformable link 104 having a link geometry shown in FIG. 2 in accordance with some embodiments. As exemplified in FIG. 11A, when a tension is applied or a pulling force is applied in a line 106 (shown in FIG. 1A) that exerts a load force around a line channel 202 (FIGS. 2A, 2B, 3A, and 3B) of the link 104, a least deformed portion 1102 in the link 104 is towards a middle portion while a most deformed portion 1104 in the link 104 is towards the second end 212 of the link 104. The least deformed portion 1102 is where the link 104 has been bent, compressed, or stretched the least amount (as compared to an unbent, uncompressed, or unstretched position). The most deformed portion is where the link 104 has been bent, compressed, or stretched the greatest amount (as compared to an unbent, uncompressed, or unstretched position). In some embodiments, as illustrated in both FIGS. 11A and 11B, the bottom of the link gets deformed the most compared to the top of the link may be due to the presence of the line channel 202 (the area where the load force applied to the line 106 is exerted) and the presence of the link geometry (e.g., the cross-sectional channel 302 and/or the opening 304).

FIG. 11B depicts an exemplary deformation compliance 1100 of a link 104 having a link geometry shown in FIGS. 3A-3D in accordance with some embodiments. As exemplified in FIG. 11B, when a tension is applied or a pulling force is applied in a line 106 (shown in FIG. 1A) that exerts a load force around a line channel 202 (FIGS. 2A, 2B, 3A, and 3B) of the link 104, the least and most deformed portions of the link 104 is similar to that of FIG. 11A. However, the magnitude of maximum deformation in the link 104 in FIG. 11B is significantly larger compared to that in FIG. 11A, illustrating the effect of link geometry on link deformation. For example, the presence of the cross-sectional channel 302 and the opening 304 in the link in FIG. 11B as opposed to just the presence of the cross-sectional channel 302 allow the deformation in the link 104 in FIG. 11B to be relatively significantly larger.

Referring back to FIGS. 1A and 1B, one or more lines 106 in tension act to apply compressive load on each link 104 after the rigidizable insertion tool 100 is formed into shape. As such, the lines 106 may generate structural deformation in each link 104 (as shown in FIGS. 11A and 11B), which accumulates to usable global shape/position change of insertion tool 100. In an illustrative non-limiting example, when at least one line 106 is transitioned from a relax status to a tension status (e.g., the tension assembly 600 applies tension or initiates pulling action in the line 106), the at least one line 106 closes gaps 110 between all links 104 (deformable and non-deformable links) and thus forms and/or shapes the rigidizable insertion tool 100. Alternatively or in addition, increasing the tension in at least one line 106 after the gaps 110 in between the links 104 are closed may induce compressive load between the links 104. This tension-dependent compressive load may result in structural deformation in each link 104, which can stack up to noticeable (e.g., more than 1, 3, 5, 10 degrees, etc.) global shape and/or position change of insertion tool 100 (e.g., as shown in FIGS. 7 and 8). In some embodiments, the geometry or the structure of the deformable link 104 can be specifically designed to increase compliance and thus increase its position adjustment sensitivity to tension. In some embodiments, tension control may be needed to regulate tension to target values correlated to deployment and inspection position. Moreover, when out-of-plane deviation exists, the in-plane position adjustment mechanism described herein can be combined with simple rotation mechanisms along borescope port insertion axis to provide low-cost 2-degrees of freedom (DOF) adjustment solution for both in-plane and out-of-plane deviation.

The tension-based position adjustment described herein can be run in an open loop after calibration when tension-position correlation has good repeatability. Alternatively or in addition, the tension-based position adjustment described herein can be run using feedback data obtained from and/or captured by one or more tool position sensors 920 described herein, such as those shown in FIG. 9. The embodiments described herein provide a simple, low-cost and effective inspection tool position adjustment method and can compensate position deviation caused by various factors: (1) structural deflection under gravitational load, (2) accumulation of manufacturing and assembly tolerance, and/or (3) engine mounting variation. Moreover, combining the rigidizable insertion tool 100 described herein with simple out-of-plane adjustment, such as rotation along borescope port insertion axis, multiple degrees of freedom (DOF) position compensation capability can be enabled as well. For example, the rigidizable insertion tool 100 described herein provides an accurate and repeatable positioning of a camera to inspection station. Furthermore, the rigidizable insertion tool 100 described herein provides camera positioning accuracy and image quality improvement in the presence of gravitational load and manufacturing tolerance accumulation. As such, one or more advantages provided by the rigidizable insertion tool 100 are reduced maintenance burden in an inspection of an engine and low-cost to achieve position compensation.

Further aspects of the present disclosure are provided by the subject matter of the following clauses:

A rigidizable insertion tool comprising: a plurality of links arranged in a sequence, the plurality of links includes at least one deformable link that is structurally deformable; and a tension assembly configured to apply a first tensioning force on the plurality of links to actuate the plurality of links from a relaxed state to a rigidized state having a first shape, wherein the tension assembly is further configured to apply a second tensioning force greater than the first tensioning force to the plurality of links while in the rigidized state to cause structural deformation of the at least one deformable link and change a shape of the plurality of links from the first shape to a second shape.

The rigidizable insertion tool of any preceding clause wherein the second tensioning force is based on a stored value of forces applied to change the shape of the at least one deformable link to a predetermined shape.

The rigidizable insertion tool of any preceding clause further comprising an insertion tube, wherein the plurality of links is movable through the insertion tube.

The rigidizable insertion tool of any preceding clause further comprising a controller configured to continuously vary a tensioning force applied by the tension assembly according to a length of the rigidizable insertion tool deployed.

The rigidizable insertion tool of any preceding clause wherein the at least one deformable link comprises one or more line channels extending axially within a deformable portion of the at least one deformable link, and wherein the tension assembly comprises one or more lines extending through the one or more line channels of the at least one deformable link to apply tension.

The rigidizable insertion tool of any preceding clause wherein a portion of the one or more line channels comprises an opening extending to a cavity of the at least one deformable link.

The rigidizable insertion tool of any preceding clause wherein a value of the second tensioning force comprises a range between 100% to 500% of the first tensioning force.

The rigidizable insertion tool of any preceding clause wherein an application of the second tensioning force results in a radial bending of the plurality of links between 60% to 100% of an original radius of a rigidized insertion tool.

The rigidizable insertion tool of any preceding clause wherein an end of the at least one deformable link comprises one or more protrusions configured to engage with one or more indentions of a neighboring link to align the at least one deformable link with the neighboring link and to limit relative movement of the at least one deformable link and the neighboring link when the first tensioning force is applied.

The rigidizable insertion tool of any preceding clause wherein the tension assembly is further configured to apply subsequent tensioning force based on at least one of: repeatability of tension-position correlation or feedback information.

The rigidizable insertion tool of any preceding clause wherein the feedback information is based on at least one of: one or more images captured by a camera and sensor data from one or more light detection and ranging (LIDAR) sensor, inertial measurement unit (IMU) sensor, structure light measurement sensor, three-dimensional (3D) stereo camera, and laser distance sensor.

The rigidizable insertion tool of any preceding clause wherein the at least one deformable link comprises a cross-sectional channel extending laterally through the at least one deformable link.

The rigidizable insertion tool of any preceding clause wherein the cross-sectional channel comprises an opening through a deformable portion of the at least one deformable link.

A method for operating a rigidizable insertion tool within an engine defining a path, the method comprising: inserting the rigidizable insertion tool at least partially into the path of the engine while a plurality of links of the rigidizable insertion tool are in a relaxed state, wherein the rigidizable insertion tool comprises: the plurality of links arranged in a sequence and a tension assembly, wherein the plurality of links includes at least one deformable link that is structurally deformable; applying, by the tension assembly, a first tensioning force on the plurality of links to actuate the plurality of links from the relaxed state to a rigidized state having a first shape; and applying, by the tension assembly, a second tensioning force greater than the first tensioning force on the plurality of links while in the rigidized state to cause structural deformation of the at least one deformable link and change a shape of the plurality of links from the first shape, wherein the second tensioning force changes the shape from the first shape to a second shape.

The method of any preceding clause wherein the second tensioning force is based on a stored value of forces applied to change the shape of the at least one deformable link to a predetermined shape.

The method of any preceding clause wherein the rigidizable insertion tool further comprises an insertion tube, and wherein the plurality of links is movable through the insertion tube.

The method of any preceding clause further comprising continuously varying, by a controller communicatively coupled to the tension assembly, a tensioning force applied by the tension assembly according to a length of the rigidizable insertion tool deployed.

The method of any preceding clause wherein the at least one deformable link comprises one or more line channels extending axially within a deformable portion of the at least one deformable link, and wherein the tension assembly comprises one or more lines extending through the one or more line channels of the at least one deformable link to apply tension.

The method of any preceding clause wherein a value of the second tensioning force comprises a range between 100% to 500% of the first tensioning force.

The method of any preceding clause wherein the applying of the second tensioning force results in a radial bending of the plurality of links between 60% to 100% of an original radius of a rigidized insertion tool.

The method of any preceding clause further comprising applying, by the tension assembly, subsequent tensioning force based on at least one of: repeatability of tension-position correlation or feedback information.

The method of any preceding clause wherein the feedback information is based on at least one of: one or more images captured by a camera and sensor data from one or more light detection and ranging (LIDAR) sensor, inertial measurement unit (IMU) sensor, structure light measurement sensor, three-dimensional (3D) stereo camera, and laser distance sensor.

The method of any preceding clause wherein an end of the at least one deformable link comprises one or more protrusions configured to engage with one or more indentions of a neighboring link to align the at least one deformable link with the neighboring link and to limit relative movement of the at least one deformable link and the neighboring link when the first tensioning force is applied.

Those skilled in the art will recognize that a wide variety of other modifications, alterations, and combinations can also be made with respect to the above described embodiments without departing from the scope of this disclosure, and that such modifications, alterations, and combinations are to be viewed as being within the ambit of the inventive concept.

The invention claimed is:

1. A rigidizable insertion tool comprising:

a plurality of links arranged in a sequence, wherein the plurality of links are separate and individual structures such that the plurality of links form a non-continuous structure, the plurality of links including at least one deformable link that is structurally deformable and includes a deformable portion within the separate and individual structure of the at least one deformable link; and a tension assembly configured to apply a first tensioning force on the plurality of links to actuate the plurality of links from a relaxed state to a rigidized state having a first shape, wherein the tension assembly is further configured to apply a second tensioning force greater than the first tensioning force to the plurality of links while in the rigidized state to cause structural deformation of the at least one deformable link and change a shape of the plurality of links from the first shape to a second shape.

2. The rigidizable insertion tool of claim 1, wherein the second tensioning force is based on a stored value of forces applied to change the shape of the at least one deformable link to a predetermined shape.

3. The rigidizable insertion tool of claim 1, further comprising an insertion tube, wherein the plurality of links is movable through the insertion tube.

4. The rigidizable insertion tool of claim 1, further comprising a controller configured to continuously vary a tensioning force applied by the tension assembly according to a length of the rigidizable insertion tool deployed.

5. The rigidizable insertion tool of claim 1, wherein the at least one deformable link comprises one or more line channels extending axially within a deformable portion of the at least one deformable link, and wherein the tension assembly comprises one or more lines extending through the one or more line channels of the at least one deformable link to apply tension.

6. The rigidizable insertion tool of claim 1, wherein a value of the second tensioning force comprises a range between 100% to 500% of the first tensioning force.

7. The rigidizable insertion tool of claim 1, wherein an application of the second tensioning force results in a radial bending of the plurality of links between 60% to 100% of an original radius of a rigidized insertion tool.

8. The rigidizable insertion tool of claim 1, wherein the tension assembly is further configured to apply subsequent tensioning force based on at least one of: repeatability of tension-position correlation or feedback information.

9. The rigidizable insertion tool of claim 1, wherein the tension assembly is further configured to apply subsequent tensioning force based on feedback information, and wherein the feedback information is based on at least one of: one or more images captured by a camera and sensor data from one or more light detection and ranging (LIDAR) sensor, inertial measurement unit (IMU) sensor, structured light measurement sensor, three-dimensional (3D) stereo camera, and laser distance sensor.

10. The rigidizable insertion tool of claim 1, wherein the at least one deformable link comprises a cross-sectional channel extending laterally through the at least one deformable link.

11. The rigidizable insertion tool of claim 10, wherein the cross-sectional channel comprises an opening through a z of the at least one deformable link.

12. A rigidizable insertion tool comprising:

a plurality of links arranged in a sequence, the plurality of links including at least one deformable link that is structurally deformable; and a tension assembly configured to apply a first tensioning force on the plurality of links to actuate the plurality of links from a relaxed state to a rigidized state having a first shape, wherein the tension assembly is further configured to apply a second tensioning force greater than the first tensioning force to the plurality of links while in the rigidized state to cause structural deformation of the at least one deformable link and change a shape of the plurality of links from the first shape to a second shape;

wherein the at least one deformable link comprises one or more line channels extending axially within a deformable portion of the at least one deformable link, and wherein the tension assembly comprises one or more lines extending through the one or more line channels of the at least one deformable link to apply tension;

wherein a portion of the one or more line channels comprises an opening extending to a cavity of the at least one deformable link.

13. A rigidizable insertion tool comprising:

a plurality of links arranged in a sequence, the plurality of links including at least one deformable link that is structurally deformable; and a tension assembly configured to apply a first tensioning force on the plurality of links to actuate the plurality of links from a relaxed state to a rigidized state having a first shape, wherein the tension assembly is further configured to apply a second tensioning force greater than the first tensioning force to the plurality of links while in the rigidized state to cause structural deformation of the at least one deformable link and change a shape of the plurality of links from the first shape to a second shape;

wherein an end of the at least one deformable link comprises one or more protrusions configured to engage with one or more indentions of a neighboring link to align the at least one deformable link with the neighboring link and to limit relative movement of the at least one deformable link and the neighboring link when the first tensioning force is applied.

14. A method for operating a rigidizable insertion tool within an engine defining a path, the method comprising:

inserting the rigidizable insertion tool at least partially into the path of the engine while a plurality of links of the rigidizable insertion tool are in a relaxed state, wherein the rigidizable insertion tool comprises: the plurality of links arranged in a sequence and a tension assembly, wherein the plurality of links are separate and individual structures such that the plurality of links form a non-continuous structure, and wherein the plurality of links includes at least one deformable link that is structurally deformable;

applying, by the tension assembly, a first tensioning force on the plurality of links to actuate the plurality of links from the relaxed state to a rigidized state having a first shape; and applying, by the tension assembly, a second tensioning force greater than the first tensioning force on the plurality of links while in the rigidized state to cause structural deformation of the at least one deformable link and change a shape of the plurality of links from the first shape, wherein the second tensioning force changes the shape from the first shape to a second shape.

15. The method of claim 14, wherein the second tensioning force is based on a stored value of forces applied to change the shape of the at least one deformable link to a predetermined shape.

16. The method of claim 14, wherein the rigidizable insertion tool further comprises an insertion tube, and wherein the plurality of links is movable through the insertion tube.

17. The method of claim 14, further comprising continuously varying, by a controller communicatively coupled to the tension assembly, a tensioning force applied by the tension assembly according to a length of the rigidizable insertion tool deployed.

18. The method of claim 14, wherein a value of the second tensioning force comprises a range between 100% to 500% of the first tensioning force.

19. The method of claim 14, wherein the applying of the second tensioning force results in a radial bending of the plurality of links between 60% to 100% of an original radius of a rigidized insertion tool.

20. The method of claim 14, further comprising applying, by the tension assembly, subsequent tensioning force based on at least one of: repeatability of tension-position correlation or feedback information.

* * * * *